(12) United States Patent
Hattori et al.

(10) Patent No.: US 6,288,803 B1
(45) Date of Patent: *Sep. 11, 2001

(54) HOLOGRAM DISPLAY

(75) Inventors: Hidekazu Hattori, Nagoya; Kenichiro Takada, Kuwana; Tooru Matsumoto, Ichinomiya, all of (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,308

(22) Filed: Oct. 27, 1998

(30) Foreign Application Priority Data

Oct. 27, 1997 (JP) .................................................. 9-311134
Nov. 13, 1997 (JP) .................................................. 9-330963
Sep. 10, 1998 (JP) ................................................. 10-256302

(51) Int. Cl.⁷ .............................. G02B 5/02; G02B 5/32
(52) U.S. Cl. ........................................... 359/15; 359/599
(58) Field of Search ............................ 359/150, 16, 453, 359/454, 599

(56) References Cited

U.S. PATENT DOCUMENTS

| 4,372,639 | 2/1983 | Johnson . | |
|---|---|---|---|
| 4,586,780 | * 5/1986 | Chern et al. | 359/34 |
| 4,586,781 | * 5/1986 | Gunther et al. | 359/15 |
| 4,610,499 | * 9/1986 | Chern et al. | 359/15 |
| 4,623,214 | * 11/1986 | Bazargan | 359/24 |
| 4,960,314 | 10/1990 | Smith . | |
| 5,010,950 | 4/1991 | Voith . | |
| 5,016,950 | 5/1991 | Smith | 350/3.7 |
| 5,200,844 | 4/1993 | Suvada . | |
| 5,418,631 | * 5/1995 | Tedesco | 359/15 |
| 5,600,454 | * 2/1997 | Trayner et al. | 359/15 |

FOREIGN PATENT DOCUMENTS

| 58-500875 | 5/1983 | (JP) . |
|---|---|---|
| 1210922 | * 8/1989 | (JP) . |
| 1158236 | * 11/1989 | (JP) . |
| 2-72321 | 3/1990 | (JP) . |
| 2-77737 | 3/1990 | (JP) . |
| 3118234 | * 5/1991 | (JP) . |
| 3194585 | * 8/1991 | (JP) . |
| 6227286 | * 8/1994 | (JP) . |
| 8-201722 | 8/1996 | (JP) . |
| 928530 | * 2/1997 | (JP) . |

* cited by examiner

*Primary Examiner*—Cassandra Spyrou
(74) *Attorney, Agent, or Firm*—Pillsbury Winthrop LLP

(57) ABSTRACT

A hologram display has a projector (2), a hologram screen (9), and a filter set (25) that is arranged between the projector and the hologram screen to absorb light with a peak diffraction efficiency in a specific wavelength area. The hologram display faithfully reproduces original colors and improves productivity. Also provided is a hologram screen having a hologram element (11) for diffracting and scattering a projected beam (21) from a projector (2), and a light scattering element (12) whose scattering angle is at least five degrees. The hologram screen correctly reproduces original colors.

15 Claims, 24 Drawing Sheets

HOLOGRAM DISPLAY

BACKGROUND OF THE INVENTION

1. Field of the Invention

The present invention relates to a hologram display employing a transparent hologram element as a screen to display images projected from a projector.

2. Description of the Related Art

A transparent hologram screen of a hologram display is known which is attached to, for example, a show window to display moving and still images projected from a projector for advertising or any other purposes. The projector is installed at an upper part or a lower part behind the screen. The screen diffracts and scatters light from the projector toward viewers so that the viewers may see images.

The conventional hologram displays, however, have some problems as follows.

One problem is that the hologram screen provides a peak efficiency in a specific wavelength area in the spectral distribution curve thereof.

As a result, reproduced light from the hologram screen intensely shows a color corresponding to the peak efficiency in the spectral distribution. Namely, the reproduced light from the hologram screen is tinged with the color corresponding to the peak wavelength area, and therefore, reproduced colors on the hologram screen are different from original colors contained in the light projected from the projector.

When the projected light contains halftone colors such as a flesh color, the peak-wavelength color conspicuously affects them.

To solve this problem, it is possible to employ a technique of making a hologram screen by multiple exposures. The hologram screen made by multiple exposures shows a uniform spectral distribution curve having at least two peaks in visible wavelengths ranging from 380 nm to 780 nm.

Multiple exposures, however, take a long time and, therefore, are unsuitable for mass production.

SUMMARY OF THE INVENTION

An object of the present invention is to provide a hologram display capable of correctly reproducing colors and improving productivity.

In order to accomplish the object, a first aspect of the present invention provides a hologram display having a projector, a hologram screen, and at least one filter disposed between the projector and the hologram screen to absorb light having a wavelength at which the diffraction efficiency in the spectral distribution characteristic is a peak in a specific wavelength area.

The filter may be an existing one used with a camera. For example, it may be a color compensating filter for compensating the color of a light source, or a light balancing filter for providing a creative effect on a photographed image.

By providing the above-mentioned filter between the projector and the screen, light projected from the projector and in the specific wavelength area is absorbed by the filter. The light passing through the filter is diffracted and scattered by the hologram screen that does not absorb the light in the wavelength area absorbed by the filter.

Since the filter reduces the power of the light with the peak diffraction efficiency in the spectral distribution curve of the hologram screen, reproduced light from the hologram screen shows a flat spectral distribution curve.

The hologram screen of the first aspect is made without multiple exposure, and the filter arranged for the projector is a standard one, to thereby improve productivity and cut production cost.

In this way, the hologram display of the first aspect is capable of correctly reproducing colors and improving productivity.

A color difference $\Delta u'v'$ between light projected from the projector and light reproduced by the hologram screen is preferably equal to or smaller than 0.03.

If this condition is met, viewers sense no difference between colors reproduced by the hologram display and original colors projected from the projector.

The color difference $\Delta u'v'$ is calculated as follows:

$$\Delta u'v' = \{(u1'-u2')^2 + (v1'-v2')^2\}^{1/2}$$

where (u1', v1') is projected light from the projector, (u2', v2') is reproduced light on the hologram screen, and u' and v' are UCS chromaticity coordinates specified by CIE (International Commission on Illumination).

A second aspect of the present invention provides a hologram screen having a hologram element for diffracting light projected from a projector and a light scattering element having a scattering angle of five degrees or larger.

The scattering element helps the hologram element to correctly reproduce the original colors and to secure a glare preventing effect to be explained with reference to FIG. 32.

The scattering angle of the scattering element must be at least five degrees. If it is smaller than five degrees, the effect of the present invention will not be secured. An upper limit of the scattering angle is also set as will be explained later. If the scattering angle is larger than the upper limit, too large an amount of the projected components will be scattered to dim the image and deteriorate the transparency of the hologram screen.

The scattering element attached to the hologram element expands the incident angle of the light that enters the hologram element from the projector, so that the hologram element may faithfully reproduce original colors.

The scattering element may be attached to either side of the hologram element.

When white light is diffracted by the hologram element, the light is provided with a peak diffraction efficiency in a blue or green wavelength area by the spectral distribution characteristics of the hologram element. When this light is passed through the scattering element, which is attached to the light exiting side of the hologram element in this case, the light becomes the original white color.

In this way, the hologram screen of the second aspect correctly reproduces original colors.

The scattering element may have a proper distance from the hologram element.

When the scattering element scatters light that enters the hologram element, viewers will see double images one on the hologram element and another on the scattering element. To avoid this, it is necessary to set a proper distance between the scattering element and the hologram element.

The distance, however, must not be too long when the scattering element is positioned in front of the hologram element because, if the distance is too long, a large part of light scattered by the scattering element will miss the hologram element to dim the images formed on the hologram element.

It is necessary to properly set the distance between the hologram element and the scattering element.

The scattering element may be arranged on the same or opposite side of the projector with respect to the hologram element.

In any case, the effect of the present invention is attainable.

The scattering element reduces the glare of zero-order light.

The scattering element may be designed to scatter light whose incident angle is within a specific range, so that the hologram screen may transmit background light and diffract light from the projector.

This maintains the transparency of the hologram screen while correctly reproducing colors of the projected light.

The specific range of incident angles is determined according to the size of the hologram screen and a positional relationship between the hologram screen and the projector.

In FIG. 22, light from the projector has an incident angle of "m" at the center of the hologram screen, "n" at the top end of the screen, and "l" at the bottom end of the screen. In this case, the scattering element is required to scatter light whose incident angle is in the range of "l" to "n."

Projected light that enters the center of the hologram screen usually has an incident angle of about 35 degrees.

In this case, the scattering element must scatter light whose incident angle is in the range of 25 to 60 degrees.

The scattering element may preferably have a perpendicular transmittance of 30% to 100% so that it can transmit background light of the hologram screen, so that viewers may see the background of the hologram screen through the same.

This expands application fields of the hologram screen. For example, the hologram screen may be attached to a show window to display moving or still images for advertising.

The scattering element may preferably be designed to scatter incident light over an angle of θ that is defined as follows:

$$\sin^{-1}\{\sin \theta i - \lambda 1/\lambda 0 \cdot (\sin \theta o - \sin \theta r)\} \leq \theta \leq \sin^{-1}\{\sin \theta i - \lambda 2/\lambda 0 \cdot (\sin \theta o - \sin \theta r)\}$$

where λ0 is a recording wavelength used to make the hologram element, λ1 is 380 nm, λ2 is 780 nm (visible light ranging from 380 nm to 780 nm), θr is an incident angle of a reference beam used to make the hologram element, θo is an incident angle of an object beam used to make the hologram element, and θi is an exiting angle of a diffracted beam emanating from the hologram element.

This arrangement faithfully reproduces the original colors projected from the projector.

If the scattering angle θ is less than this range, colors will not correctly be reproduced, and if it is above the range, images on the hologram screen will be too dim or the transparency of the hologram screen will be reduced.

The recording wavelength λ0 is used when making the hologram element. If an optical exposure system for manufacturing the hologram element employs an Ar laser, λ0 is 514.5 nm. Wavelengths λ1 and λ2 define a visible light range. Namely, λ1 is 380 nm and λ2 is 780 nm.

The reference-beam incident angle θr is measured at a given point on a photosensitive material that forms the hologram element. The object-beam incident angle θo is also measured at the given point on the photosensitive material. The exiting angle θi is measured on a beam that is produced from a beam that enters the hologram element through the same path as the reference beam and diffracted by and emanating from the hologram element.

In practice, a proper scattering angle for the scattering element is calculated with θo=0 and θi=0°. If a given scattering element has a scattering angle calculated in this way, a hologram element to which the scattering element is attached reproduces correct colors.

BRIEF DESCRIPTION OF THE DRAWINGS

The above object and features of the present invention will be more apparent from the following description of the preferred embodiments when read in conjunction with the accompanying drawings, wherein.

DESCRIPTION OF THE PREFERRED EMBODIMENTS

For a better understanding of the present invention, prior arts and the problems thereof will be explained before describing the preferred embodiments of the present invention.

Figure 34:
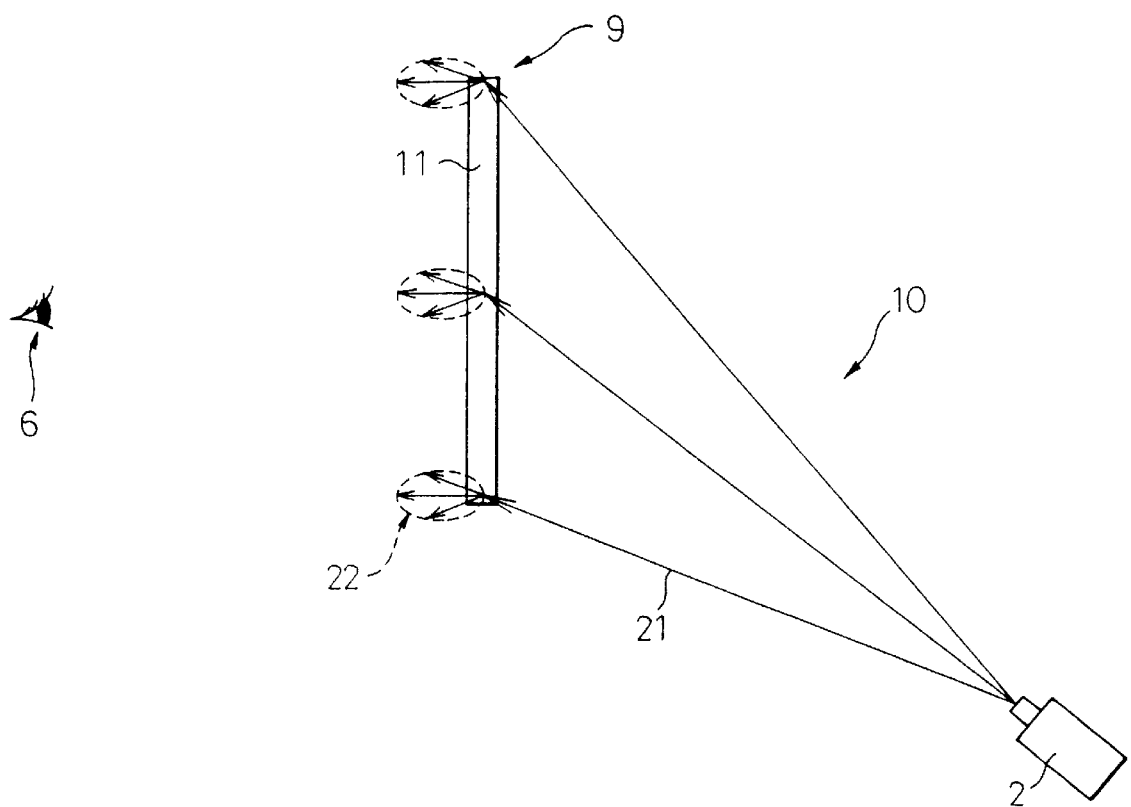
FIG. 34 explains a hologram screen according to a prior art.

FIG. 34 shows a conventional transparent hologram display. This hologram display is attached to, for example, a show window to display moving or still images for advertising.

The hologram display 10 has a hologram screen 9 having a hologram element 11. A projector 2 is installed at an upper part or a lower part behind the hologram element 11 opposite to a viewer 6. The projector 2 projects light 21 toward the hologram element 11. The light 21 forms an image, which is diffracted and scattered by the hologram element 11 toward the viewer 6, who sees the image.

Figure 35:
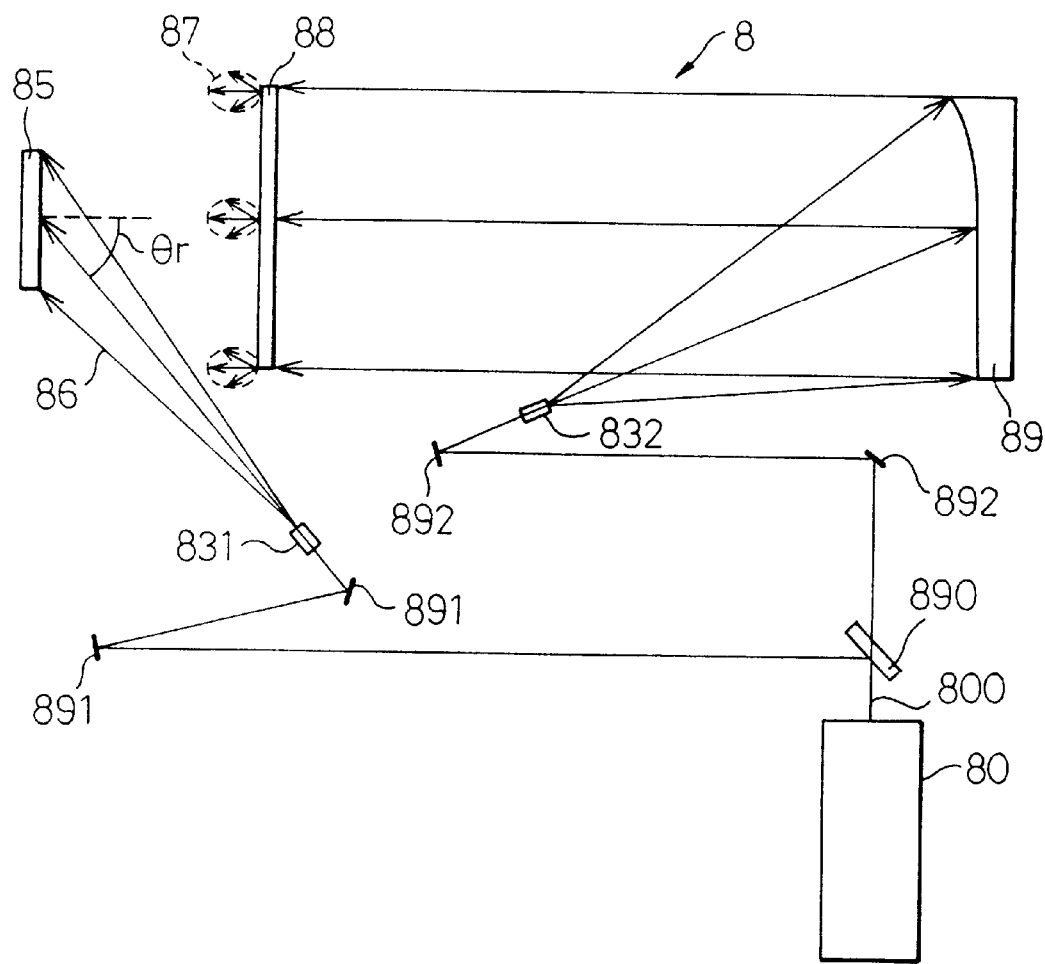
FIG. 35 shows an optical exposure system for manufacturing a hologram element.

FIG. 35 shows an optical exposure system 8 for making the hologram element 11. The system 8 records a diffuser 88 on a photosensitive material 85 serving as the hologram element 11.

A laser oscillator 80 such as an AR laser emits a laser beam 800 of, for example, 514.5 nm in wavelength. The beam 800 is divided by a semitransparent mirror 890 into two beams.

One of the beams is reflected by two reflection mirrors 891 and is passed through an object lens 831 into a divergent beam. The divergent beam serves as a reference beam 86 to irradiate the photosensitive material 85.

The other of the beams is reflected by two reflection mirrors 892 and by an object lens 832 into a divergent beam. The divergent beam is reflected by a parabolic mirror 89, and the reflected beam is passed through the diffuser 88 into a diffused beam. The diffused beam serves as an object beam 87 to irradiate the photosensitive material 85.

The problems of the hologram display of the prior art will be explained.

Figure 3:
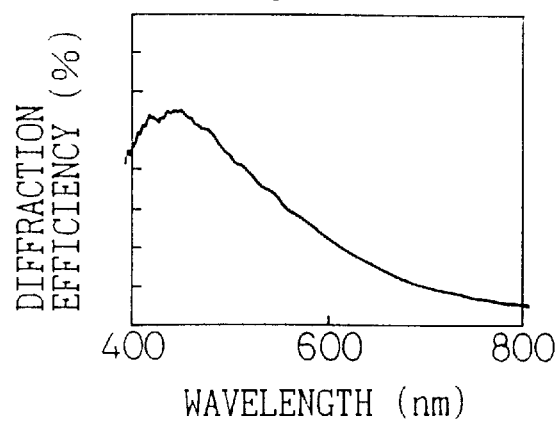
FIG. 3 shows the wavelength dependent transmittance of a hologram screen.
Figure 14:
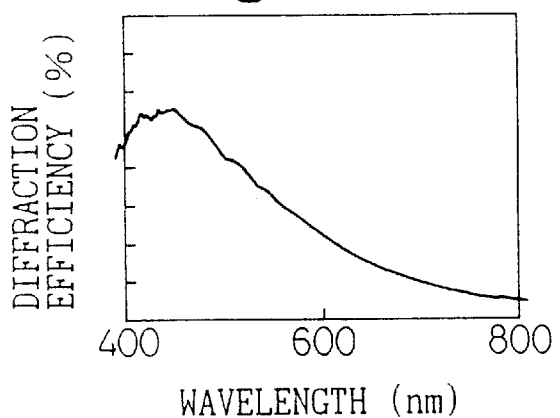
FIG. 14 shows the spectral distribution curve of a hologram screen according to the present invention.
Figure 37:
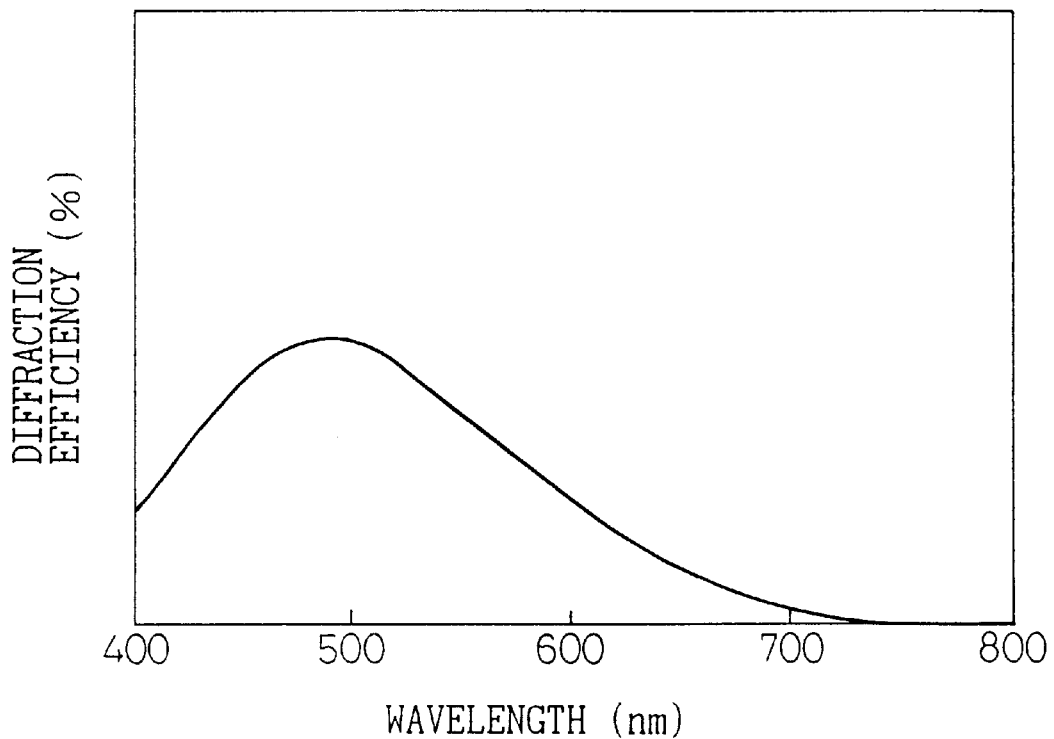
FIG. 37 shows the spectral distribution curve of a hologram element.

FIGS. 3, 14, and 37 show a specific peak wavelength area in the spectral distribution curves of the hologram element 11 of the prior art.

Due to the peak wavelength area, the hologram element 11 tinges an original image projected from the projector 2 with a green color that corresponds to the peak wavelength area. Namely, the hologram screen 9 of the prior art is incapable of faithfully reproducing original colors. This problem will be explained in more detail.

Figure 36:
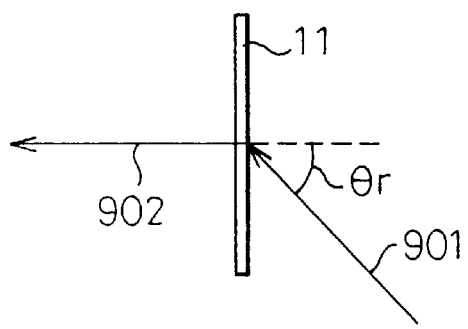
FIG. 36 explains a system for measuring the spectral distribution curve of a hologram element.

FIG. 36 shows a system for measuring the spectral distribution curve of a given hologram element 11.

A white beam 901 is made incident to the hologram element 11 at an incident angle of θr. This incident angle θr is equal to an incident angle of the reference beam 86 to the photosensitive material 85 in the optical exposure system 8 of FIG. 35 used to make the hologram element 11. Among diffracted beams from the hologram element 11, a beam 902 traveling in a zero-degree direction is measured regarding wavelength and diffraction efficiency. The diffraction efficiency is calculated as follows:

diffraction efficiency (%)=100×"intensity of beam 902"/ "intensity of white beam 901".

The zero-degree direction is orthogonal to the surface of the hologram element 11.

FIGS. 14 and 37 show a result of the measurement, i.e., the spectral distribution curve of the hologram element 11. The hologram element 11 has a peak diffraction efficiency in a blue-green wavelength area and a low diffraction efficiency in a red wavelength area.

Namely, the spectral distribution curve of the hologram element 11 of the prior art varies depending on the wavelength.

Reproduced light from the hologram element 11 involves an intensified color corresponding to the wavelength area of the peak diffraction efficiency. Therefore, there is a color difference between projected light from a projector and reproduced light from the hologram element 11.

When the projected light includes half-tone colors such as a flesh color, the color difference problem is serious.

Figure 17:
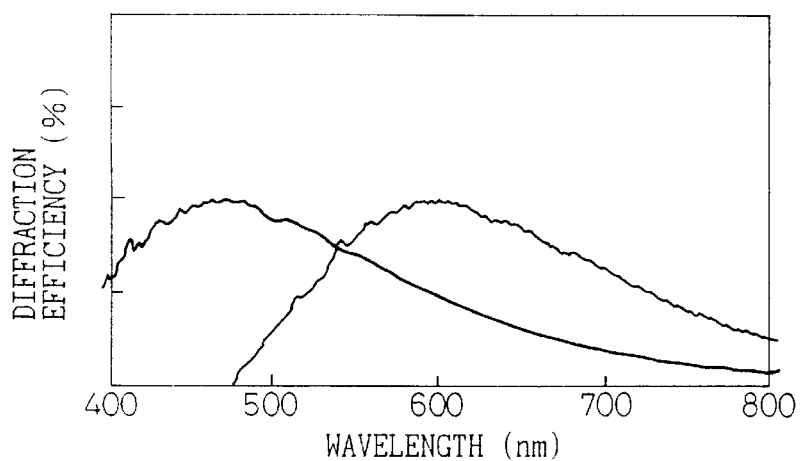
FIG. 17 shows the spectral distribution curve of a hologram screen made by multiple exposure.

To solve this problem, the multiple exposure technique may be employed to make a hologram screen. The spectral distribution curve of the hologram screen made by multiple exposure is relatively uniform and has two or more peak diffraction efficiencies in a visible light wavelength area ranging from 380 nm to 780 nm as shown in FIG. 17.

The multiple exposure, however, takes a long time to make a hologram element, and therefore, is improper for mass production.

Next, the preferred embodiments of the present invention will be explained.

Embodiment 1

FIGS. 1 to 8 show a hologram display according to the embodiment 1 of the present invention.

Figure 1:
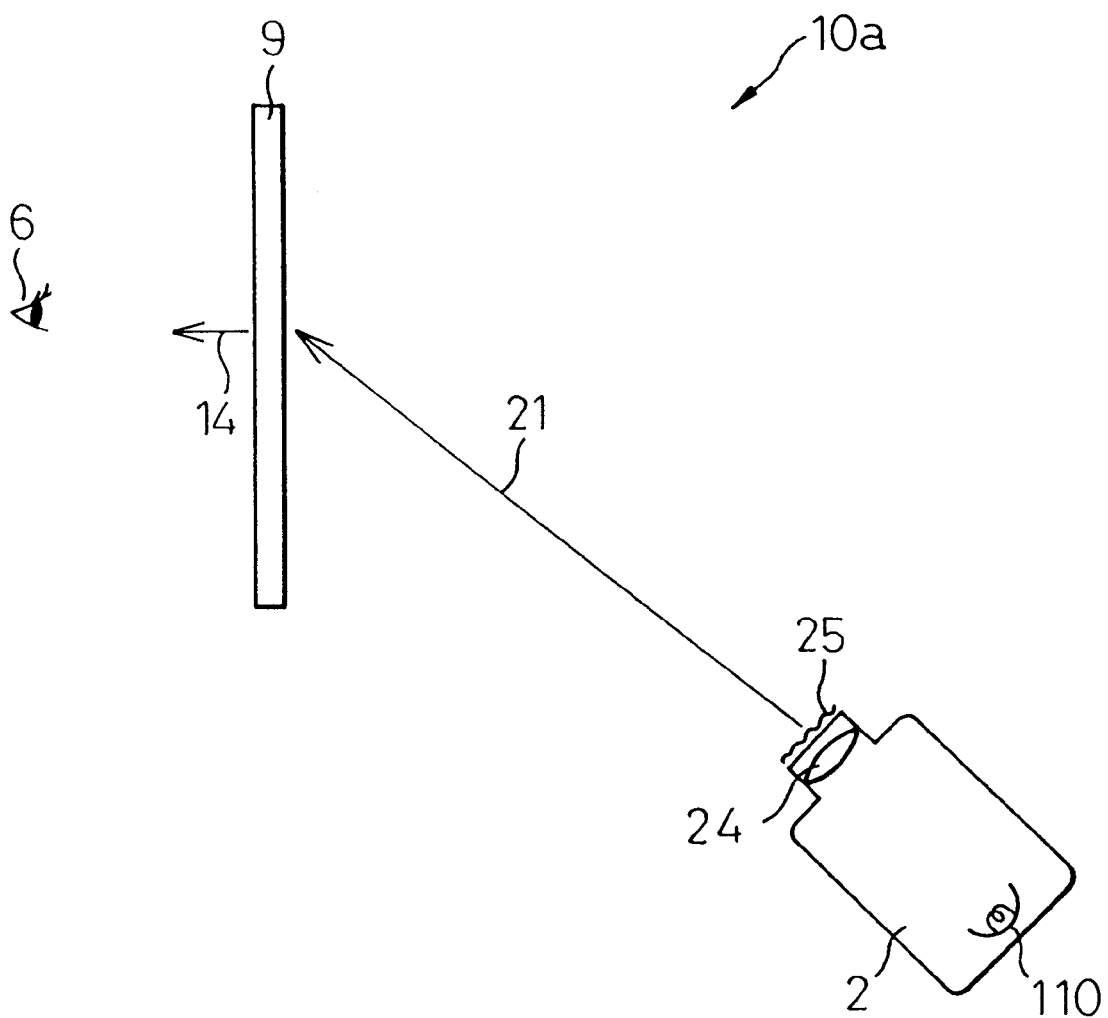
FIG. 1 shows a hologram display according to an embodiment 1 of the present invention.
Figure 2:
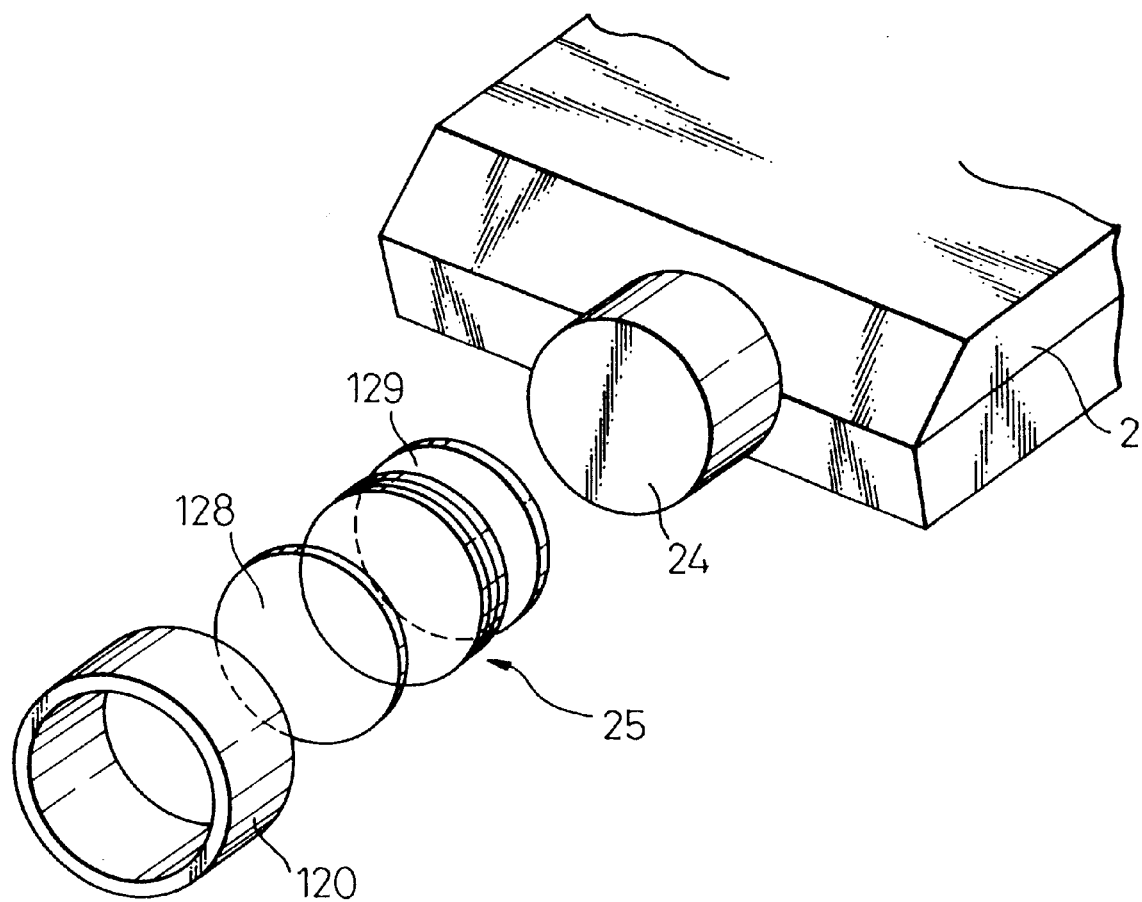
FIG. 2 is an exploded view showing a filter set attached to a projector of the embodiment 1.

In FIG. 1, the hologram display 10a has a projector 2 and a hologram screen 9. A filter set 25 is arranged between the projector 2 and the hologram screen 9. The filter set 25 consists of three filters as shown in FIG. 2 to absorb light having a wavelength at which the diffraction efficiency in the spectral distribution characteristic has a peak in a specific wavelength area.

The projector 2 may be a liquid crystal projector XV-E500 made by Sharp Ltd. The projector 2 may be a slide projector. The projector 2 projects light 21, which is passed through the filter set 25 arranged in front of a lens 24 of the projector 2. The light 21 is diffracted and scattered by the hologram screen 9 into reproduced light 14, which is caught by a viewer 6.

The projector 2 has a light source 110.

The filter set 25 is a combination of color compensating (CC) filters and light balancing (LB) filters. The filter set 25 may be a combination of three filters CC-M30, CC-Y30, and LBA-4 made by Fuji Shashin Film Ltd. The characteristics of these filters are shown in FIGS. 9, 10, and 12.

FIGS. 9 to 13 show the spectral transmittance curves of CC and LB filters.

Figure 9:
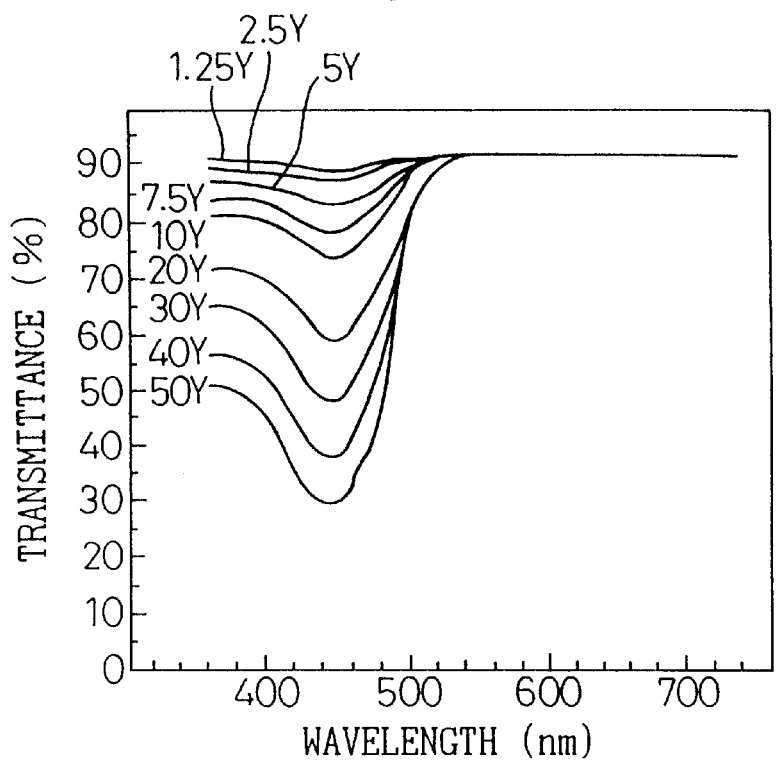
FIG. 9 shows the spectral transmittance curves of CC-Y (yellow) filters.
Figure 10:
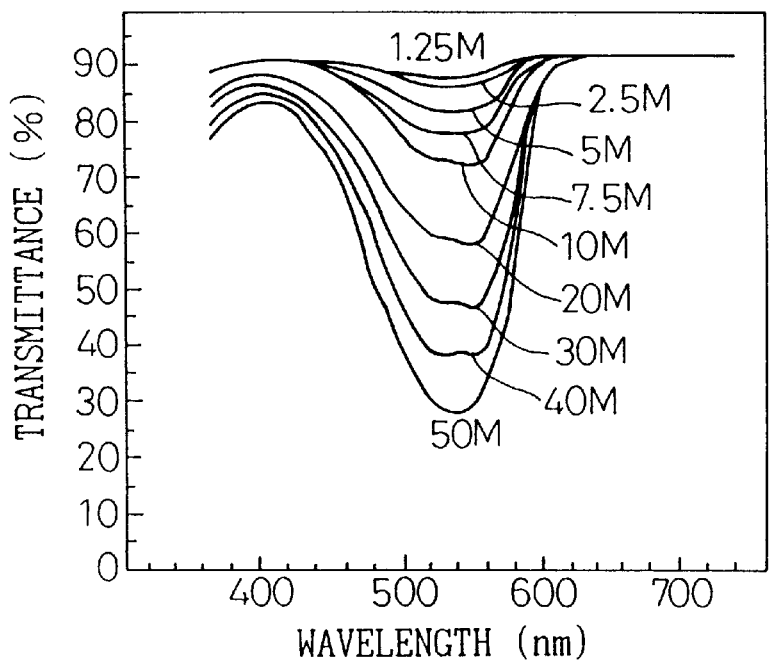
FIG. 10 shows the spectral transmittance curves of CC-M (magenta) filters.
Figure 11:
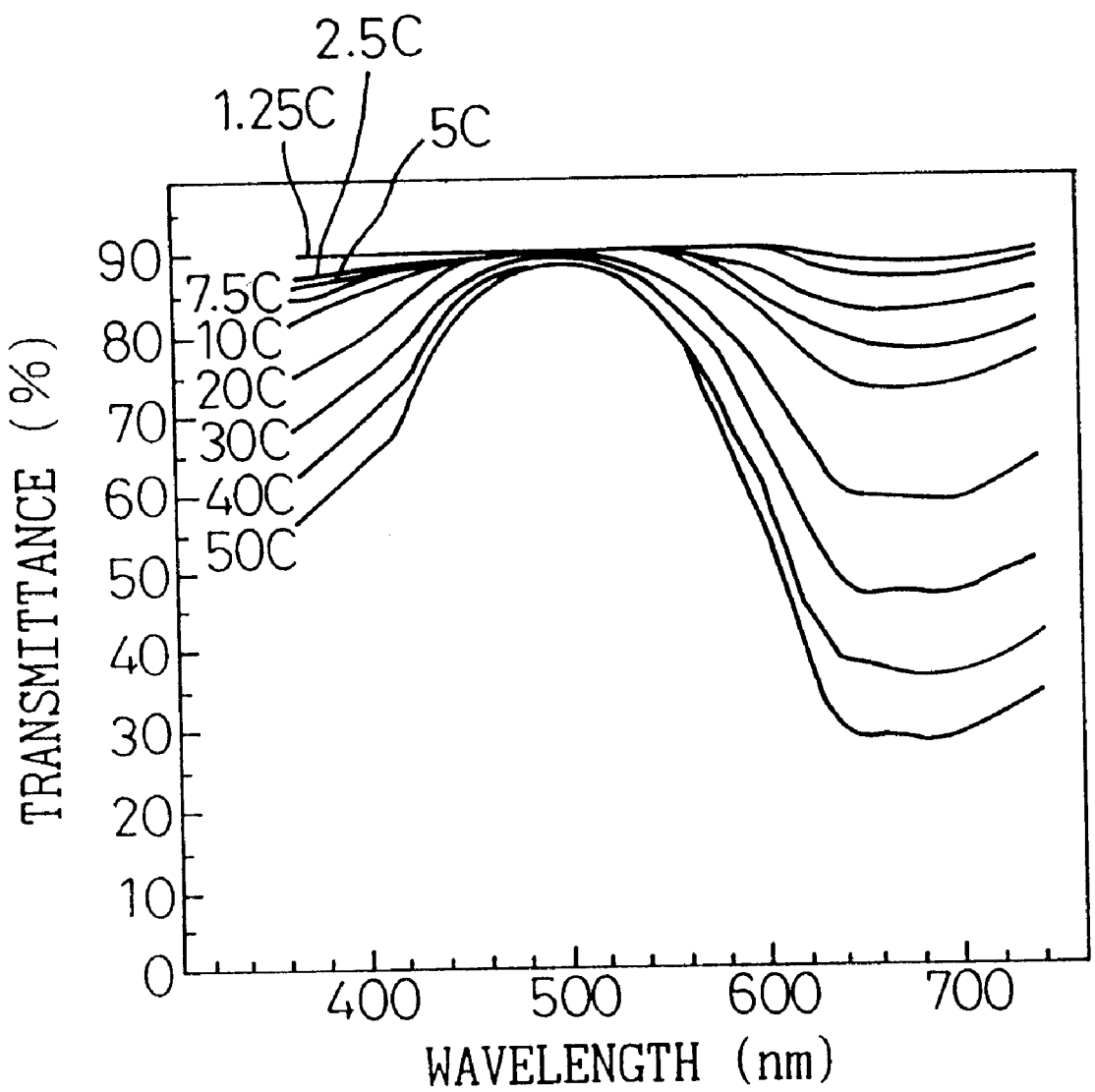
FIG. 11 shows the spectral transmittance curves of CC-C (cyan) filters.
Figure 12:
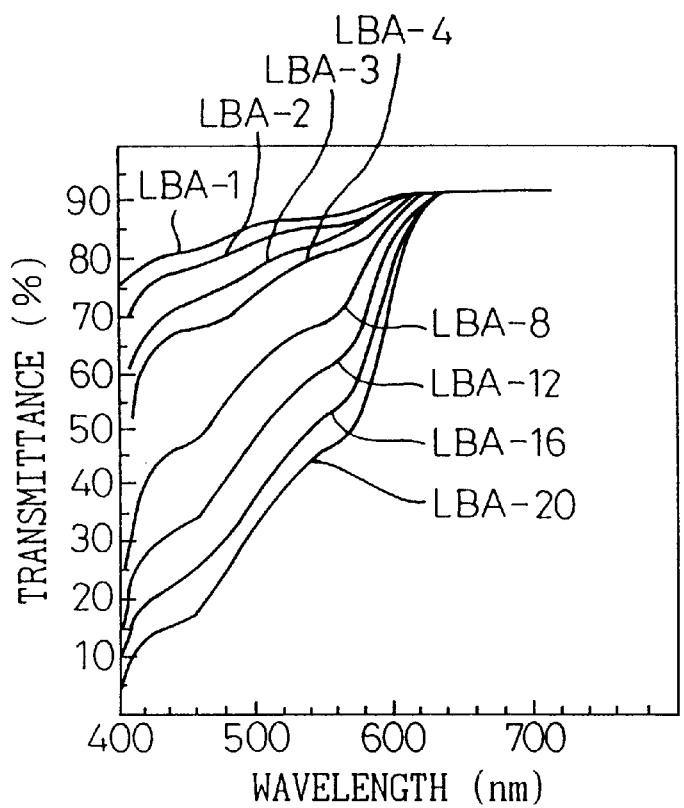
FIG. 12 shows the spectral transmittance curves of LBA filters.
Figure 13:
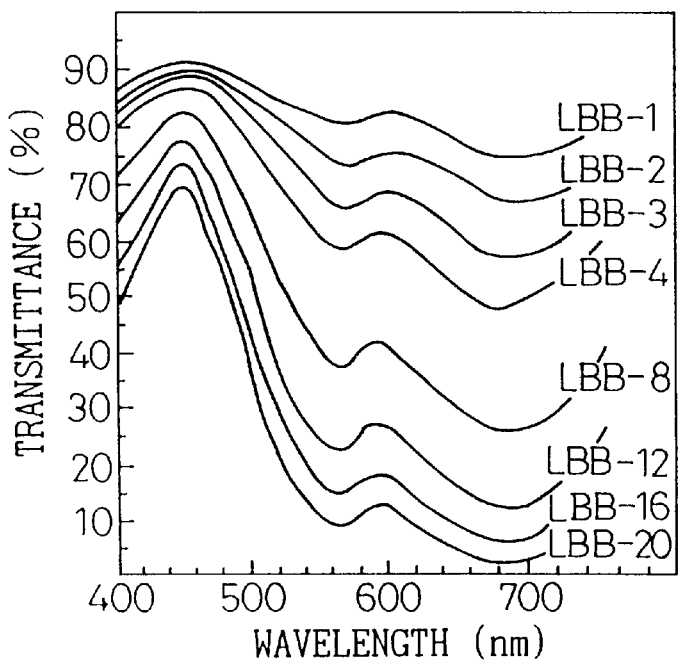
FIG. 13 shows the spectral transmittance curves of LBB filters.

The CC filters are classified into CC-Y (yellow) filters of FIG. 9, CC-M (magenta) filters of FIG. 10, and CC-C (cyan) filters of FIG. 11, and the LB filters into LBA filters of FIG. 12 and LBB filters of FIG. 13 according to light absorption wavelength areas (colors). According to absorption densities (intensities), the CC filters are classified into nine types ranging from 1.25 to 50, and the LB filters into eight types ranging from 1 to 20.

Figure 15:
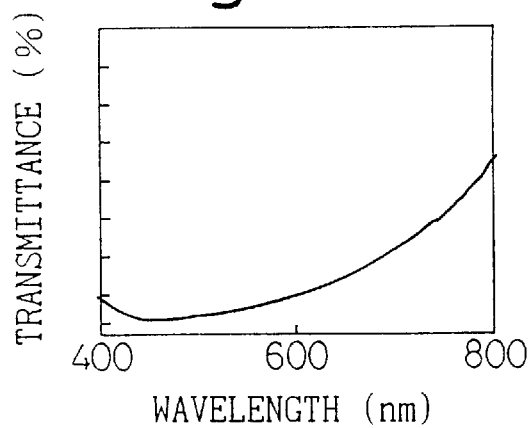
FIG. 15 shows the transmittance of an ideal filter according to the present invention.
Figure 16:
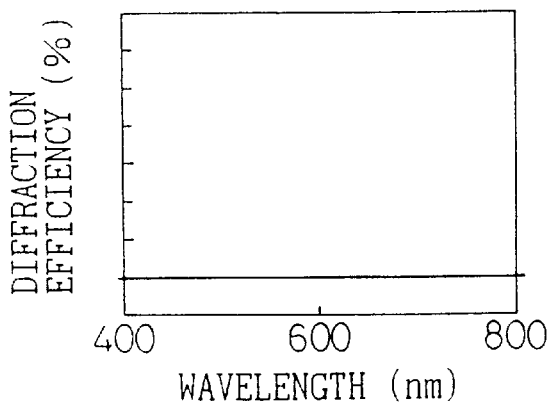
FIG. 16 shows the spectral distribution curve of reproduced light from a hologram display having an ideal filter set according to the present invention.

These filters are used individually or in combination to realize a transmittance curve of FIG. 15 and to flatten the spectral distribution curve of a given hologram element shown in FIG. 14 into one shown in FIG. 16.

Namely, these filters are selected such that the light absorption wavelengths of the filters agree with a light wavelength area with a peak diffraction efficiency in the spectral distribution curve of a given hologram element.

The following expressions are used to select a set of filters for a given hologram screen:

$$x = 1/K \int S(\lambda)\rho(\lambda)f(\lambda)/x(\lambda)d\lambda$$

$$Y = 1/K \int S(\lambda)\rho(\lambda)f(\lambda)/y(\lambda)d\lambda$$

$$Z = 1/K \int S(\lambda)\rho(\lambda)f(\lambda)/z(\lambda)d\lambda$$

$$K = \int S(\lambda)/y(\lambda)d\lambda$$

$$u' = 4X/(X+15Y+3Z)$$

$$v' = 9Y/(X+15Y+3Z)$$

where $\rho(\lambda)$ is the diffraction efficiency of the hologram screen, $S(\lambda)$ is the spectral distribution characteristics of a projector, $/x(\lambda)$, $/y(\lambda)$, and $/z(\lambda)$ are color matching functions on an XYZ coordinate system, and $f(\lambda)$ is the transmission characteristics (f1•f2•f3• . . . ) the filters to be selected.

The chromaticity coordinates (u', v') of reproduced light passed through the filters are calculable according to the above-mentioned expressions. Namely, the filters are selected such that the chromaticity coordinates of reproduced light agree with those of projected light from the projector.

The filter set 25 is sandwiched between glass plates 128 and 129, and they are set in a holder 120. The holder 120 is attached to the lens 24 of the projector 2.

When the projector 2 is a liquid crystal projector, the filter set 25 may be attached to an internal liquid crystal panel of the projector with adhesives.

Figure 4:
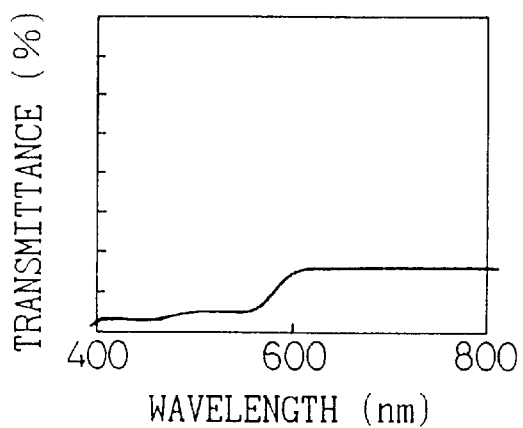
FIG. 4 shows the spectral distribution curve of the filter set of the embodiment 1.
Figure 5:
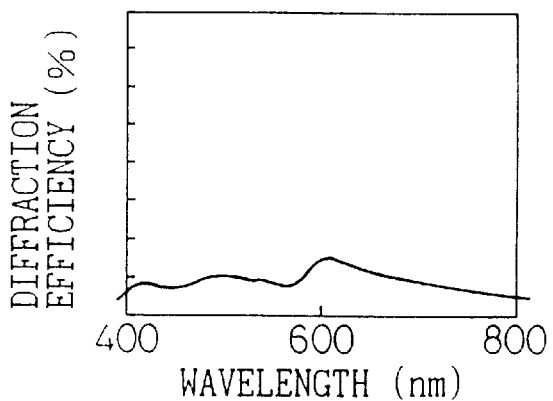
FIG. 5 shows the spectral distribution curve of reproduced light of the embodiment 1.

FIG. 3 shows the spectral distribution curve of the hologram screen 9 without the filter set 25, FIG. 4 shows the transmittance curve of the filter set 25, and FIG. 5 shows the spectral distribution curve of the hologram screen 9 with the filter set 25 according to the embodiment 1.

A test to examine the performance of the hologram display 10a of the embodiment 1 will be explained with reference to FIG. 6.

A personal computer 61 displays a white screen. The white screen is projected by a projector 62 (the liquid crystal projector XV-E500 made by Sharp Ltd.) onto a scattering element 60 made of opal glass.

Chromaticity coordinates (u', v') are measured on the scattering material 60 with a luminance meter (BM-7 of Topcon) and are used as reference values.

The reference values measured in the test were (0.1943, 0.4952).

The scattering material 60 is replaced with the hologram screen 9 of the hologram display 10a of the embodiment 1, and chromaticity coordinates (u', v') are measured as mentioned above. The values measured were (0.1659, 0.4689).

Thereafter, the filter set 25 of the embodiment 1 is attached to the projector 62, and the measurement is carried out. The values measured were (0.2123, 0.5094).

Figure 7:
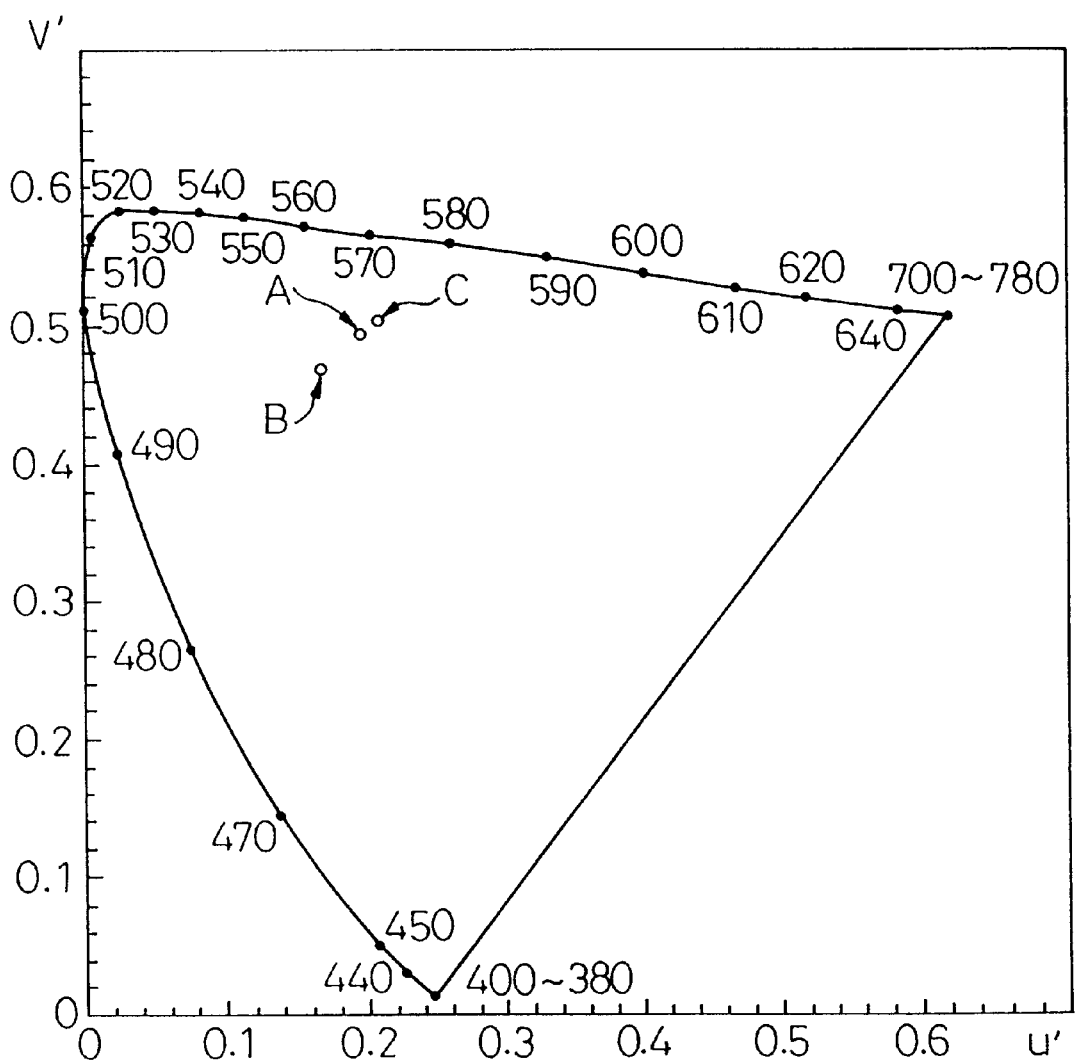
FIG. 7 shows the chromaticity coordinates of reference light, reproduced light from a hologram display without filters, and reproduced light from a hologram display with filters.

These measurements are shown in FIG. 7 in which "A" represents the reference values based on the opal glass, "B" the chromaticity coordinates without the filter set 25, and "C" the chromaticity coordinates with the filter set 25.

According to these values, a color difference $\Delta u'v'$ is calculated as follows:

$$\Delta u'v' = \{(u1'-u2')^2 + (v1'-v2')^2\}^{1/2}$$

A color difference between the values without the filter set 25 and the reference values is 0.039, and a color difference between the values with the filter set 25 and the reference values is 0.023.

It can be seen that the filter set 25 shifts the chromaticity coordinates closer to the reference values.

Generally, the naked eye senses a color difference if it is 0.03 or above. It is necessary, therefore, to bring a color difference between projected light and reproduced light within 0.03.

The hologram display 10a of the embodiment 1 realizes a small color difference between the projected light 21 and the reproduced light 14, to faithfully reproduce original colors.

Viewers tested the hologram display 10a of the embodiment 1 confirmed that the hologram display 10a reproduced colors matching with original colors.

The hologram display 10a employs no hologram screen made by multiple exposure that needs labor, time, and cost. The filters attached to the projector 2 according to the embodiment 1 are available in the market. Consequently, the embodiment 1 improves productivity and reduces production costs.

When a combination of filters is used to remove light having a peak diffraction efficiency in the spectral distribution curve of a given hologram screen, the filters may reduce the intensity of light passing through the filters because no filters have a transmittance of 100%, i.e., no filters are able to perfectly transmit light. If the number of filters combined increases, the filters decrease the quantity of light from a projector to drop the intensity of reproduced light from a hologram screen.

Figure 8:
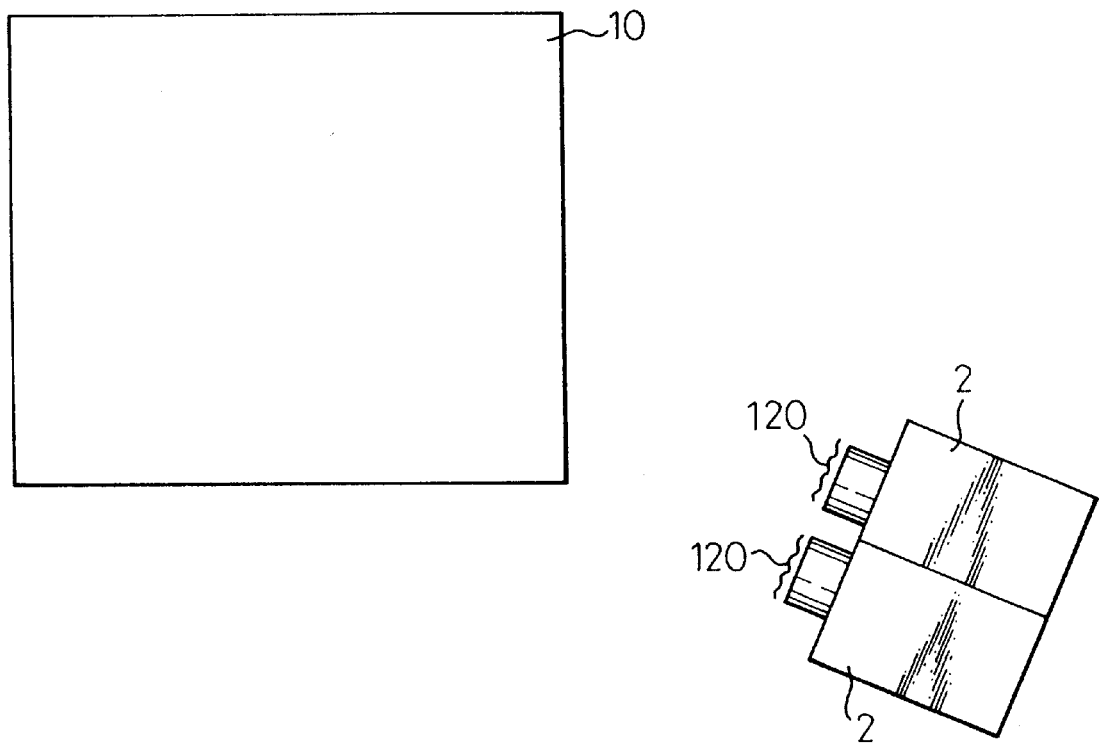
FIG. 8 shows a hologram display having two projectors based on the embodiment 1.

To prevent this, an example of FIG. 8 according to the present invention employs two projectors. Alternatively, the present invention may employ a high-intensity projector.

Embodiment 2

FIGS. 18 to 24 show a hologram screen according to the embodiment 2 of the present invention.

Figure 18:
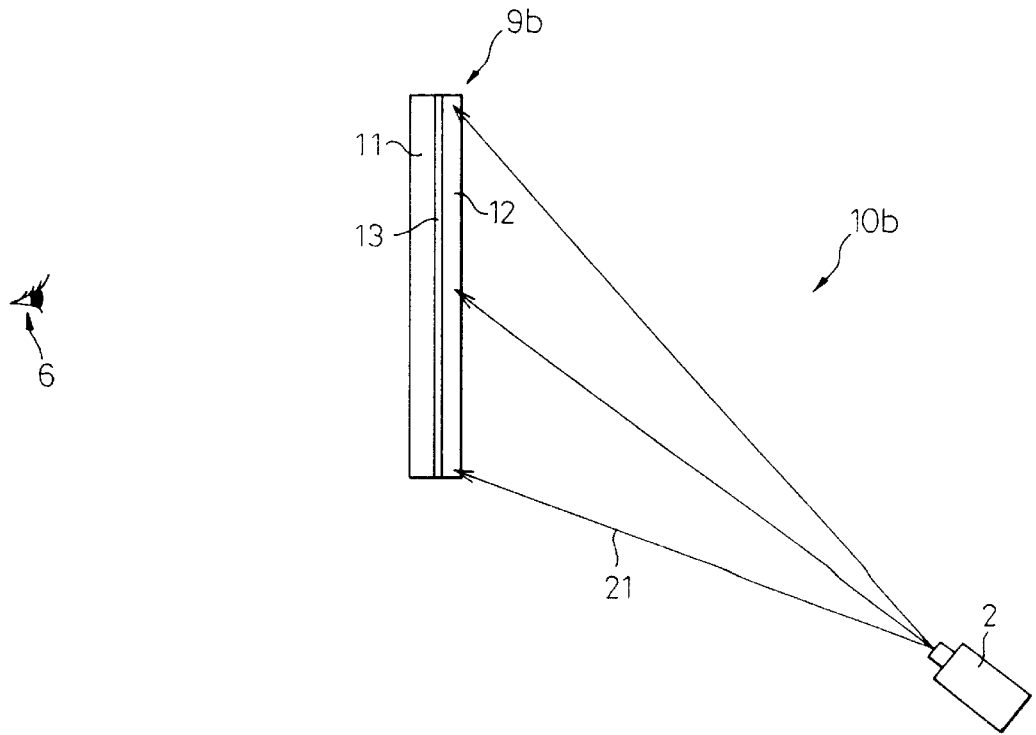
FIG. 18 shows a hologram screen according to an embodiment 2 of the present invention.

In FIG. 18, the hologram screen 9b consists of a hologram element 11 and a light scattering element 12. A projector 2 projects light 21, which is diffracted by the hologram element 11. The scattering element 12 is on the projector 2 side and is attached to the hologram element 11 with an adhesive layer 13.

The hologram screen 9b of the second embodiment 2 is characterized by combining the light scattering element 12 with the hologram element 11.

To explicitly explain the effect of the scattering element 12, the principle of a transparent hologram screen will be explained.

The conventional optical exposure system 8 of FIG. 35 records the diffuser 88 on a photosensitive material serving as a hologram element. This hologram element has interference fringes of different inclinations. Each part of the hologram element involves multiplexed interference fringes of different inclinations.

Figure 25:
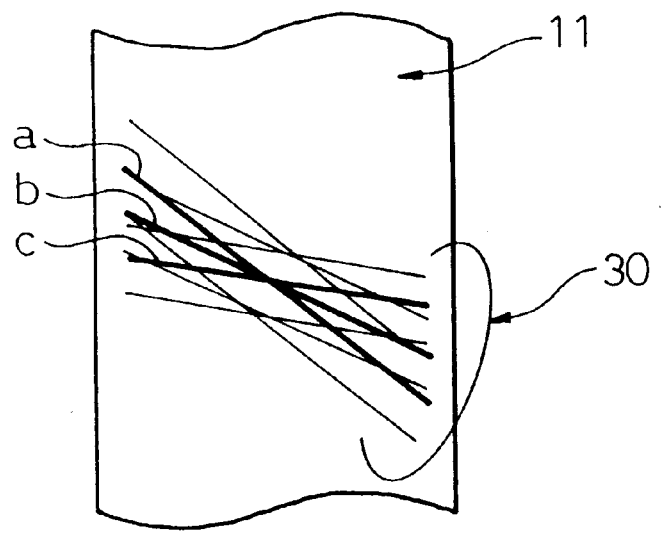
FIG. 25 explains interference fringes formed on the hologram element of the embodiment 2.

FIG. 25 shows examples of interference fringes having different inclinations on a hologram element 11.

For the sake of simplicity, the hologram element 11 of FIG. 25 involves three groups of interference fringes each group including three interference fringes having the same inclination with one of the three being depicted with a thick line. In practice, hologram elements have more interference fringes.

Figure 26:
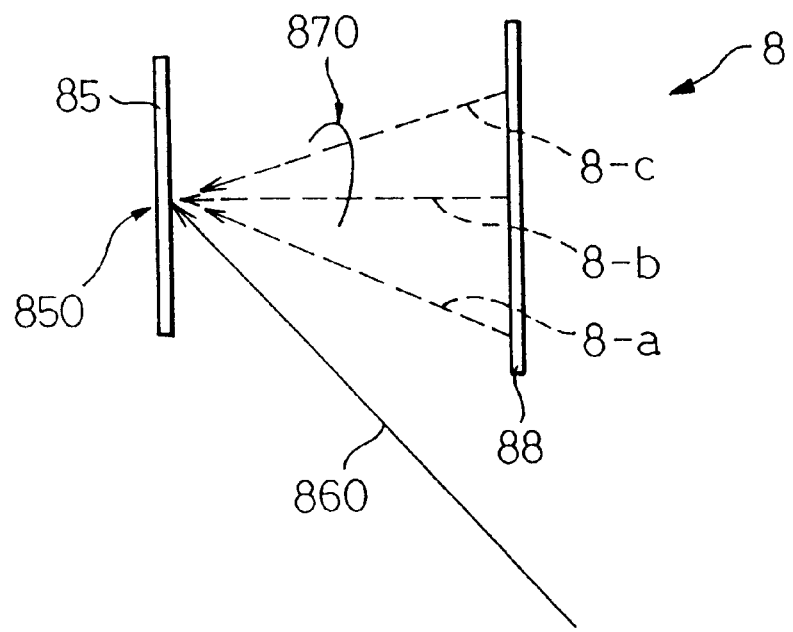
FIG. 26 shows essential parts of an optical exposure system for manufacturing the hologram element of the embodiment 2.

In FIG. 26, a reference beam 860 interferes with object beams 870 at an optional point 850 on a photosensitive material 85 serving as the hologram element 11. At this time, interference fringes are formed across the point 850, and the inclinations of the interference fringes are determined by the incident angles of the object beams 870.

An interference fringe "a" of FIG. 25 is formed by an object beam 8-a and the reference beam 860 of FIG. 26, an interference fringe "b" by an object beam 8-b and the reference beam 860, and an interference fringe "c" by an object beam 8-c and the reference beam 860.

Figure 27A:
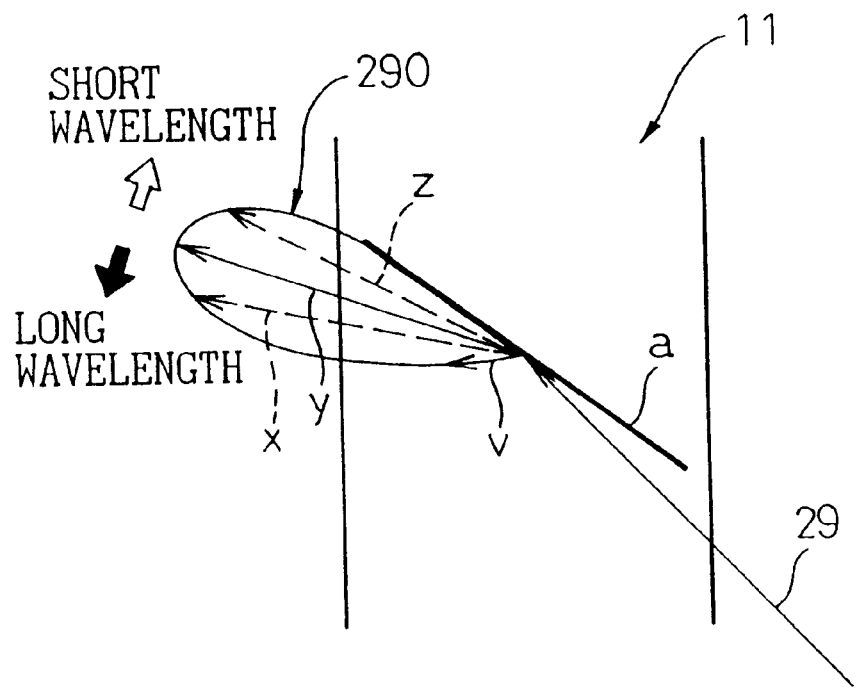
FIGS. 27A and 27B explain an interference fringe on the hologram element of the embodiment 2 and white light interfering with the fringe.
Figure 27B:
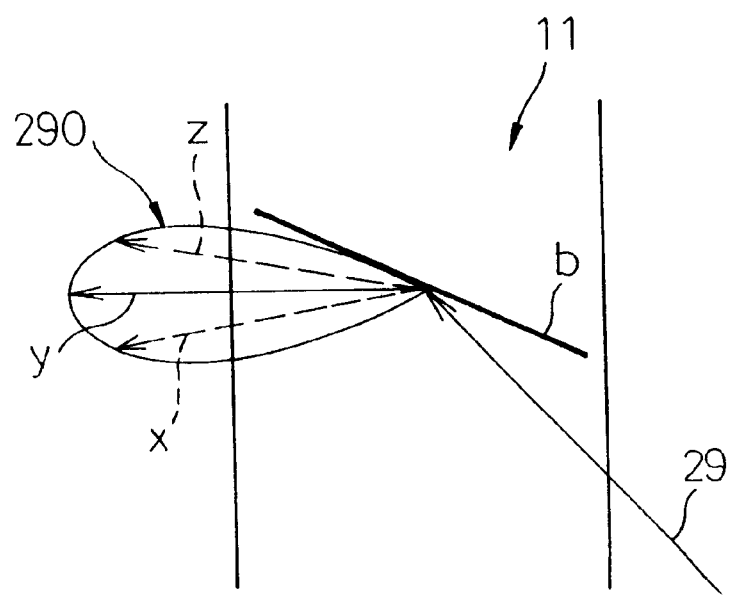

FIG. 27A shows a white beam 29 irradiating the interference fringe "a" of the hologram element 11 at an incident angle of θr that is the same as the incident angle of the reference beam 860 (FIG. 26), and FIG. 27B shows the white beam 29 irradiating the interference fringe "b" at the same incident angle as that of FIG. 27A.

In FIG. 27A, the interference fringe "a" diffracts the white beam 29 in a direction "y" that is equal to the direction of the object beam 8-a (FIG. 26). The diffracted beam in the direction "y" has a wavelength that is equal to a recording wavelength used to record the interference fringe. The white beam 29 also produces diffracted beams 290 including the one in the direction "y" as well as one in a direction "x" having a wavelength longer than the recording wavelength and one in a direction "z" having a wavelength shorter than the recording wavelength.

The diffracted beams 290 produced by the white beam 29 scatter in an oval area and provide separate colors in front of the hologram element 11.

Figure 6:
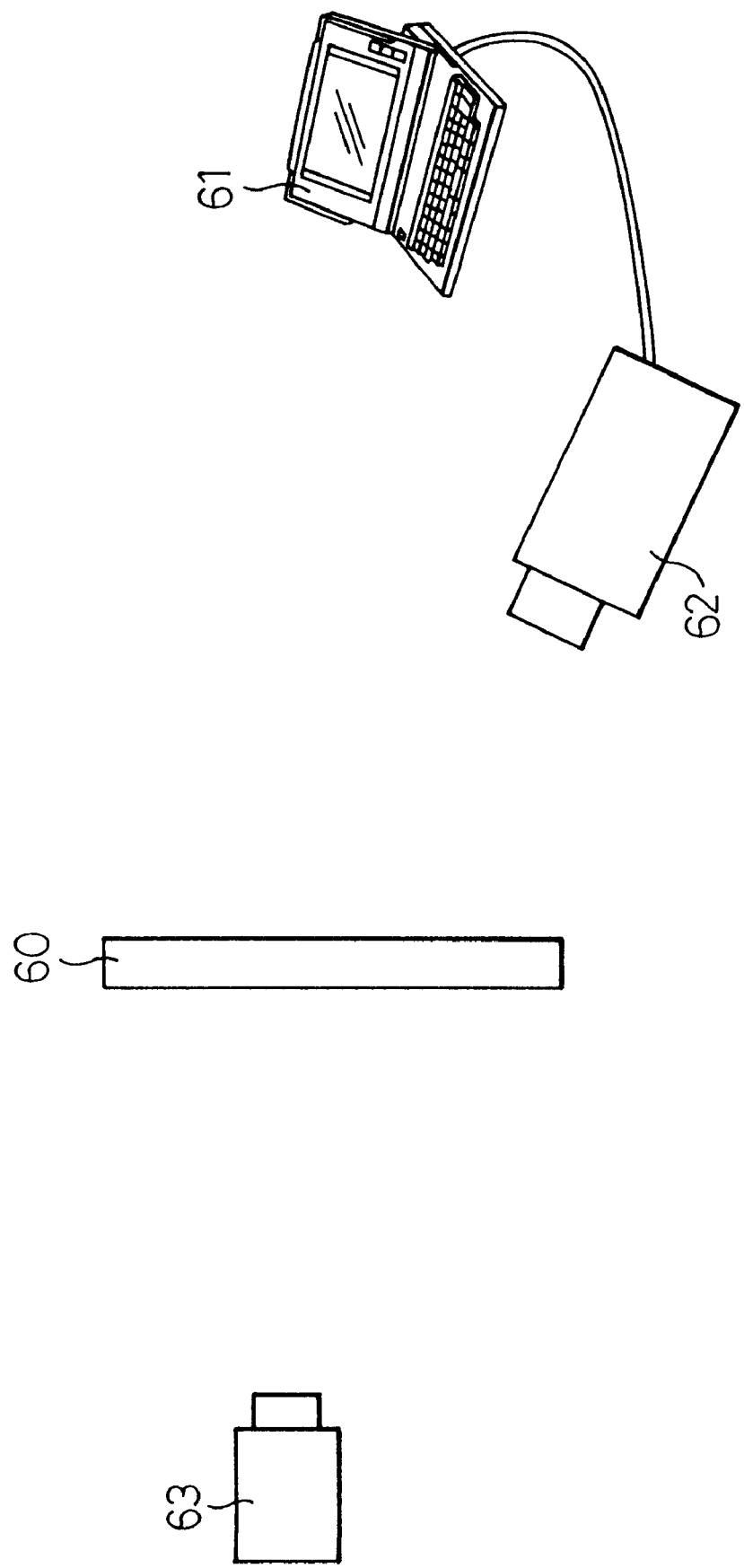
FIG. 6 shows a system for measuring chromaticity coordinates according to the embodiment 1.

Among the diffracted beams 290, one in a direction "v" having an angle of zero is detected by the measuring apparatus of FIG. 6.

In FIG. 27B, the interference fringe "b" diffracts and scatters the white beam 29 in an oval area to provide separate colors. Among the diffracted beams, one whose wavelength is the same as the recording wavelength used to record the interference fringe is diffracted in a direction "y" whose angle is zero and is detected by the measuring apparatus of FIG. 6.

In this way, beams diffracted in the zero-degree direction have individual wavelengths that are dependent on the inclinations of interference fringes that have produced the diffracted beams.

Namely, interference fringes recorded on a hologram element provide diffracted beams having different wavelengths and directions.

Diffracted beams in the zero-degree direction from interference fringes on a given hologram element determine the spectral distribution curve of the hologram element, such as one shown in FIG. 37 that has a peak in a blue-green wavelength area.

The spectral distribution curve of a given hologram screen affects images displayed on the hologram screen. Namely, it tinges the images with a specific color such as blue or green.

Figure 28:
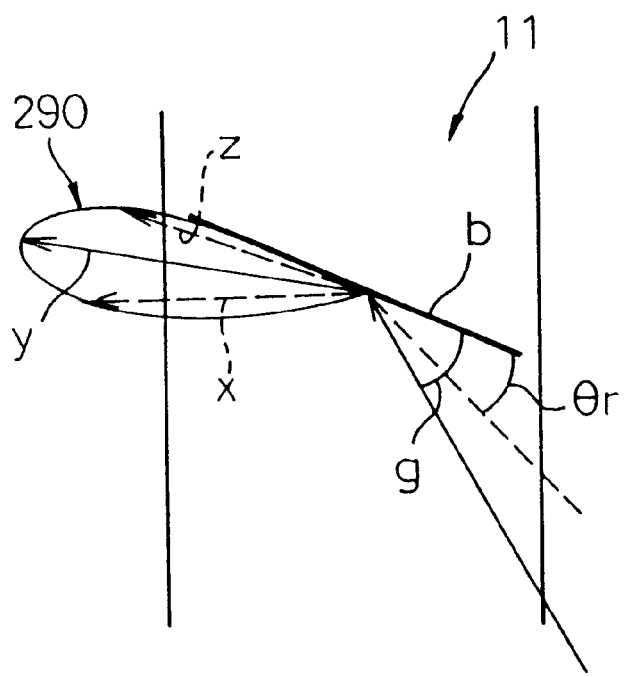
FIG. 28 shows an interference fringe on the hologram element of the embodiment 2 and white light having an incident angle of "g" that is greater than a reference-beam incident angle of θr.

FIG. 28 shows a white beam 28 made incident to the interference fringe "b" of FIG. 27B at an angle "g" that is larger than the incident angle θr of the reference beam 860 (FIG. 26). In this case, the interference fringe "b" provides diffracted beams 290.

According to Bragg's diffraction formula, a beam whose wavelength is the same as a recording wavelength used to record the interference fringe "b" is diffracted in a direction "z," and a beam whose wavelength is longer than the recording wavelength is diffracted in a zero-degree direction "x."

If the white beam 28 has an incident angle smaller than the reference-beam incident angle θr, a beam having a longer wavelength than the recording wavelength is diffracted in the zero-degree direction.

If a white beam scattered over a certain range of incident angles is made incident to an interference fringe having an inclination, diffracted beams produced by the white beam and interference fringe in the zero-degree direction will have a wide range of wavelengths. This flattens the spectral characteristics of diffracted beams emanating from the hologram element 11.

Namely, widening a beam projected onto a hologram element over a range of incident angles produces diffracted beams whose color is close to an original color.

Based on these considerations, the embodiment 2 of the present invention combines a hologram element with a light scattering element to expand a projected beam over a certain range of incident angles to faithfully reproduce original colors.

The scattering element functions to expand incident light over an angle θ that is defined as follows:

$$\sin^{-1}\{\sin\theta i - \lambda 1/\lambda 0 \cdot (\sin\theta o - \sin\theta r)\} \leq \theta \leq \sin^{-1}\{\sin\theta i - \lambda 2/\lambda 0 \cdot (\sin\theta o - \sin\theta r)\}$$

where $\lambda 0$ is a recording wavelength used to make the hologram element, $\lambda 1$ is 380 nm, $\lambda 2$ is 780 nm (the range of visible light from 380 nm to 780 nm), $\theta r$ is an incident angle of a reference beam used to make the hologram element, $\theta o$ is an incident angle of an object beam used to make the hologram element, and $\theta i$ is an exiting angle of a diffracted beam emanating from the hologram element.

The details of the scattering element will be explained.

The hologram element 11 (FIG. 18) of the embodiment 2 is manufactured by the optical exposure system 8 (FIG. 35). The diffuser 88 of the system 8 is arranged so that the incident angle θo (FIG. 24A) of the object beam is in the range of −20 to 10 degrees. The incident angle θr (FIG. 24A) of the reference beam 86 is 35 degrees.

The projected beam 21 (FIGS. 22 and 23) is scattered by the light scattering element 12 to form scattered beams 210, which enter the hologram element 11. The scattered beams 210 are diffracted and scattered by the hologram element 11, to form a diffracted beam 211 (FIG. 24B). The diffracted beam 211 has an exiting angle θi. For viewers standing in front of the hologram screen 9b, the exiting angle θi is substantially zero.

By substituting θr=35, θo=0, and θi=0 into the above expressions, the angle θ is in the range of 25 to 60 degrees.

The light scattering element 12 having such scattering characteristics may be a directional light scattering film having an adhesive layer, such as LUMISTY MFY-2555 of Sumitomo Kagaku.

Figure 19:
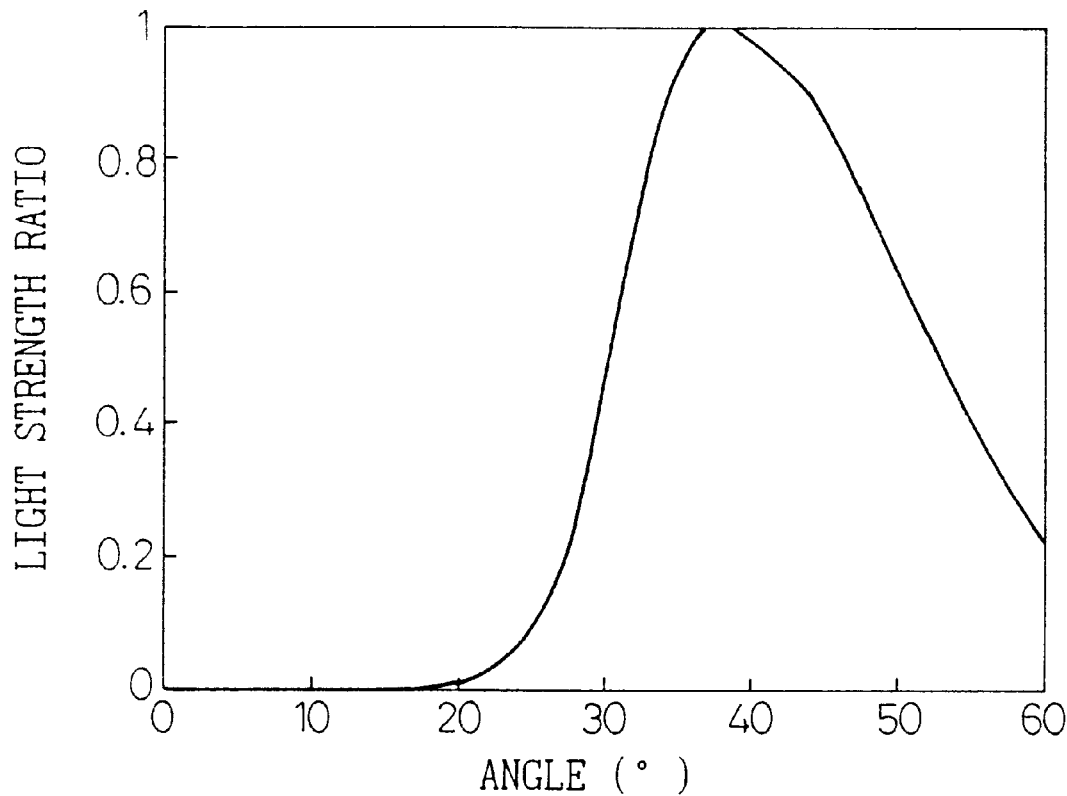
FIG. 19 shows the scattering characteristics of a light scattering element of the embodiment 2.

FIG. 19 shows the scattering characteristics of the directional light scattering film.

Figure 20:
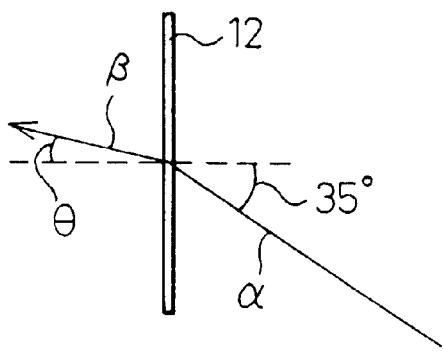
FIG. 20 explains a system for measuring the scattering characteristics of a light scattering element according to the embodiment 2.

FIG. 20 shows a system for measuring the scattering characteristics of a scattering element. A white beam α is made incident to a given scattering film 12 at an incident angle of 35 degrees, and the strength of an exiting scattered beam β is measured at an angle of θ that is varied.

The scattering characteristics of FIG. 19 show that the directional light scattering film used for the embodiment 2 transmits any beam having an incident angle smaller than 20 degrees and scatters beams whose incident angle is greater than 20 degrees. A range of incident angles that provides a practical scattering performance is from 25 to 60 degrees.

This scattering film is used as the scattering element 12 of the hologram screen 9b of the embodiment 2, so that the hologram screen 9b transmits the background toward the viewer 6. Namely, the viewer 6 sees the background and senses that the hologram screen 9b is transparent.

The adhesive layer 13 is made of transparent material not to deteriorate the transparency of the hologram screen 9b.

Figure 21:
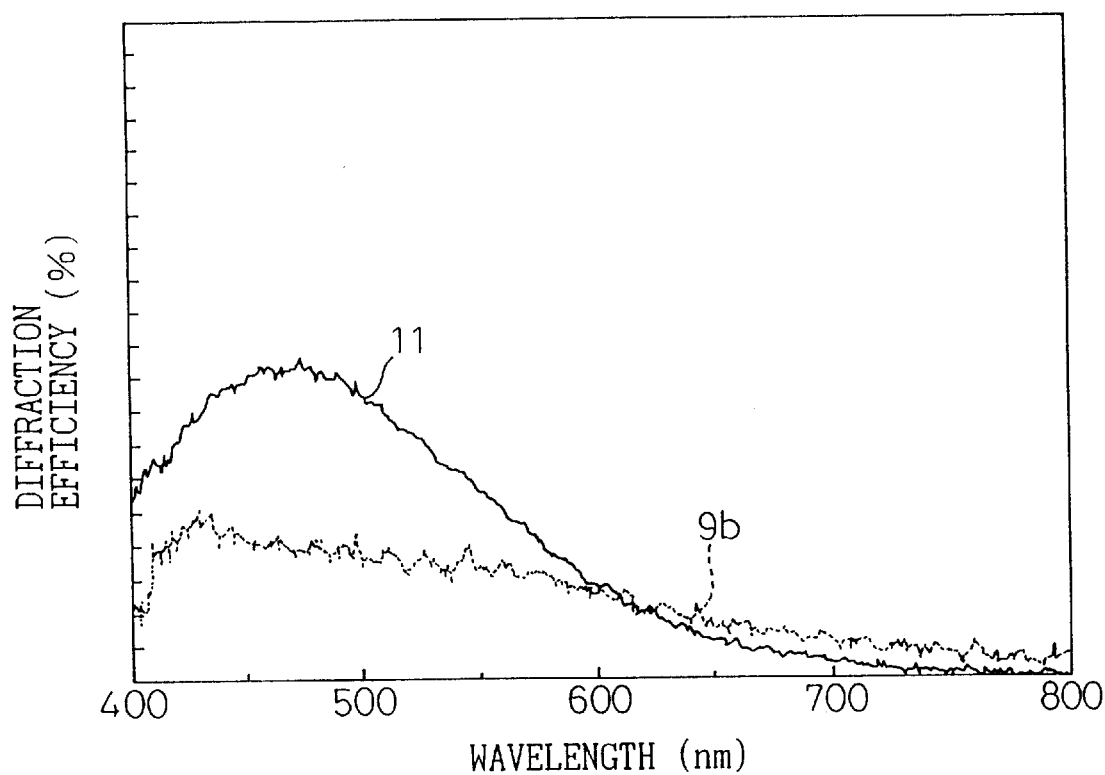
FIG. 21 shows the spectral distribution curves of a hologram screen and hologram element of the embodiment 2.

FIG. 21 shows the spectral distribution curve of the hologram screen 9b of the embodiment 2 and that of the hologram element 11 without the scattering element 12.

The spectral distribution curve of the hologram screen 9b is wide and flat and involves little efficiency differences with respect to wavelengths. Although the hologram element 11 alone provides images tinged with green, the hologram screen 9b nearly perfectly provides images with original colors.

The effect and operation of the embodiment 2 will be explained.

Figure 22:
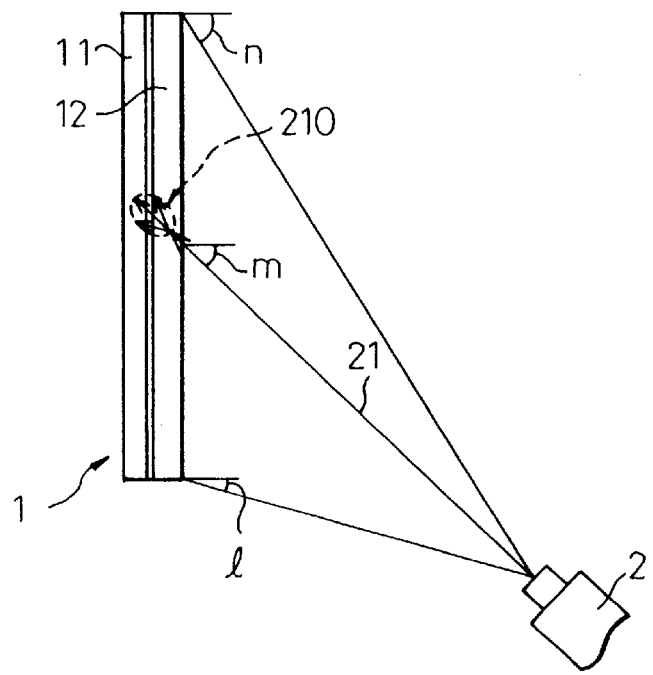
FIG. 22 shows the hologram screen of the embodiment 2.

FIG. 22 shows a hologram screen 1 composed of a light scattering element 12 and a hologram element 11 according to the embodiment 2.

A projector 2 projects a beam 21, which is scattered by the scattering element 12 into scattered beams 210, which enter the hologram element 11.

Figure 23:
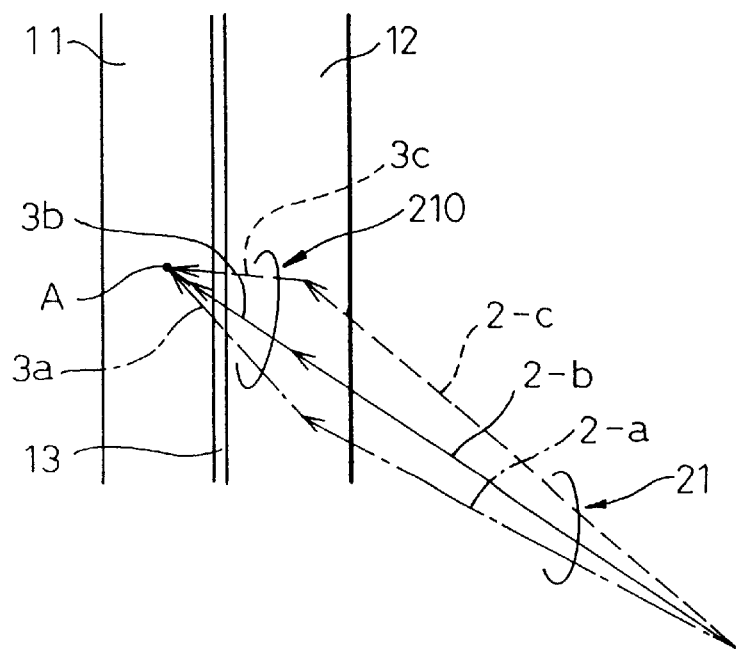
FIG. 23 explains the effect of the light scattering element on a hologram screen according to the embodiment 2.
Figure 24A:
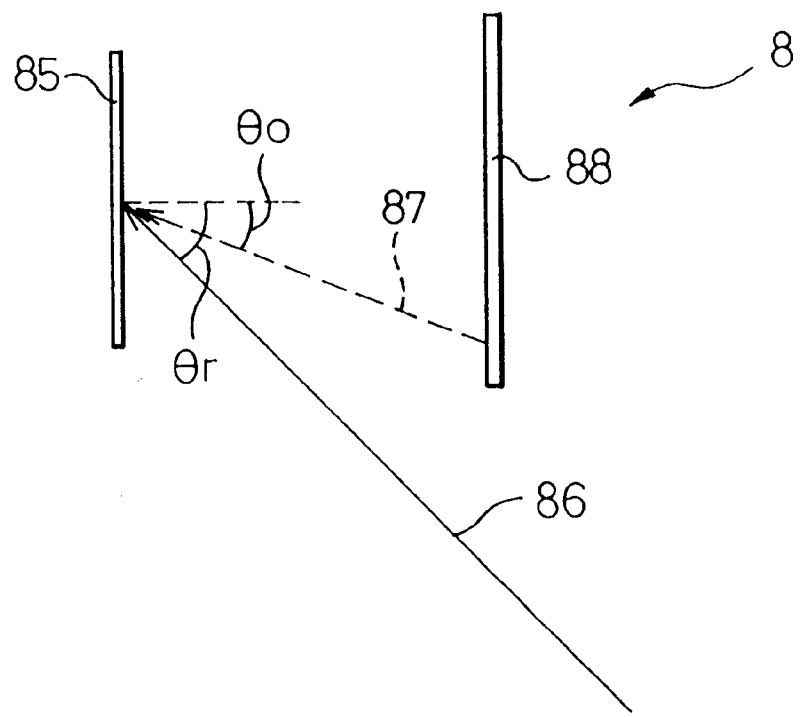
FIG. 24A shows essential parts of an optical exposure system for manufacturing the hologram element of the embodiment 2.
Figure 24B:
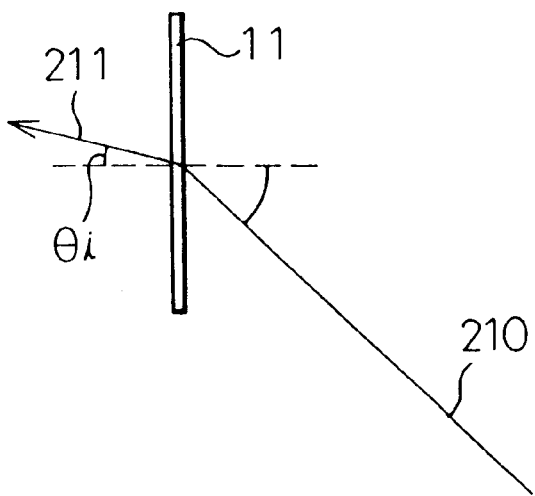
FIG. 24B explains diffracted light from the hologram element of the embodiment 2.

In FIG. 23, the hologram element 11 has a point A to which the scattered beams 210 travel from the scattering element 12 at different angles 3a, 3b, and 3c.

Namely, the scattering element 12 expands the beam 21 projected to the hologram element 11 over a range of incident angles.

This results in broadening the spectral characteristics of the hologram element 11 and improving the color reproducibility of the hologram screen 1.

If the hologram screen 1 is not required to be completely transparent, for example, if it is allowed to be colored, the scattering element 12 and adhesive layer 13 may be translucent.

The scattering element 12 may be a hologram element having a light scattering function. For example, hologram elements may be laminated one upon another to provide a light scattering effect.

Although the embodiment 2 arranges the scattering element 12 on the projector 2 side, the scattering element 12 may be arranged on the viewer side.

Embodiment 3

The embodiment 3 of the present invention finds optimum scattering characteristics, in particular, optimum scattering angles for a light scattering element.

Tests were made on light scattering elements to find optimum scattering angles for them. These tests and results thereof will be explained with reference to FIGS. 29 to 31.

The tested scattering elements were made of laminations of one to five translucent films.

Figure 29:
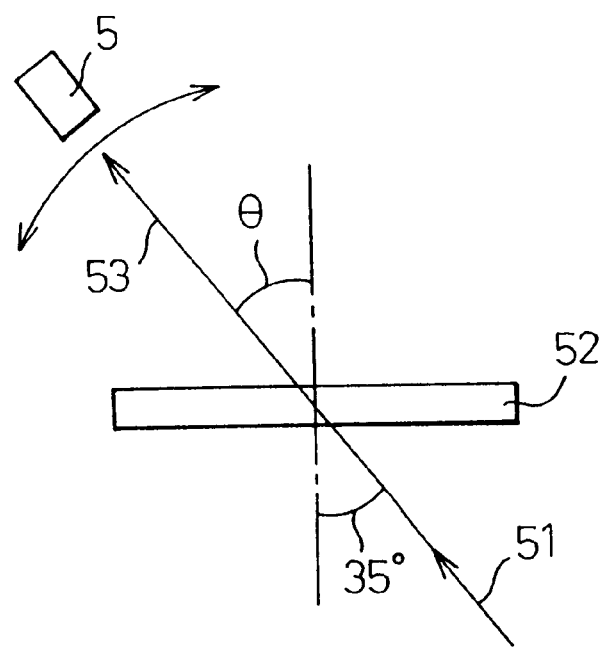
FIG. 29 explains a system for measuring a light receiving ratio according to an embodiment 3 of the present invention.

In FIG. 29, a laser beam 51 of 514.5 nm in wavelength is made incident to a lamination 52 at an incident angle of 35 degrees. The beam 51 is passed through the lamination 52 and forms an exiting beam 53. The intensity of the exiting beam 53 is measured by a luminance meter 5 while angularly moving the position of the meter 5.

Figure 30:
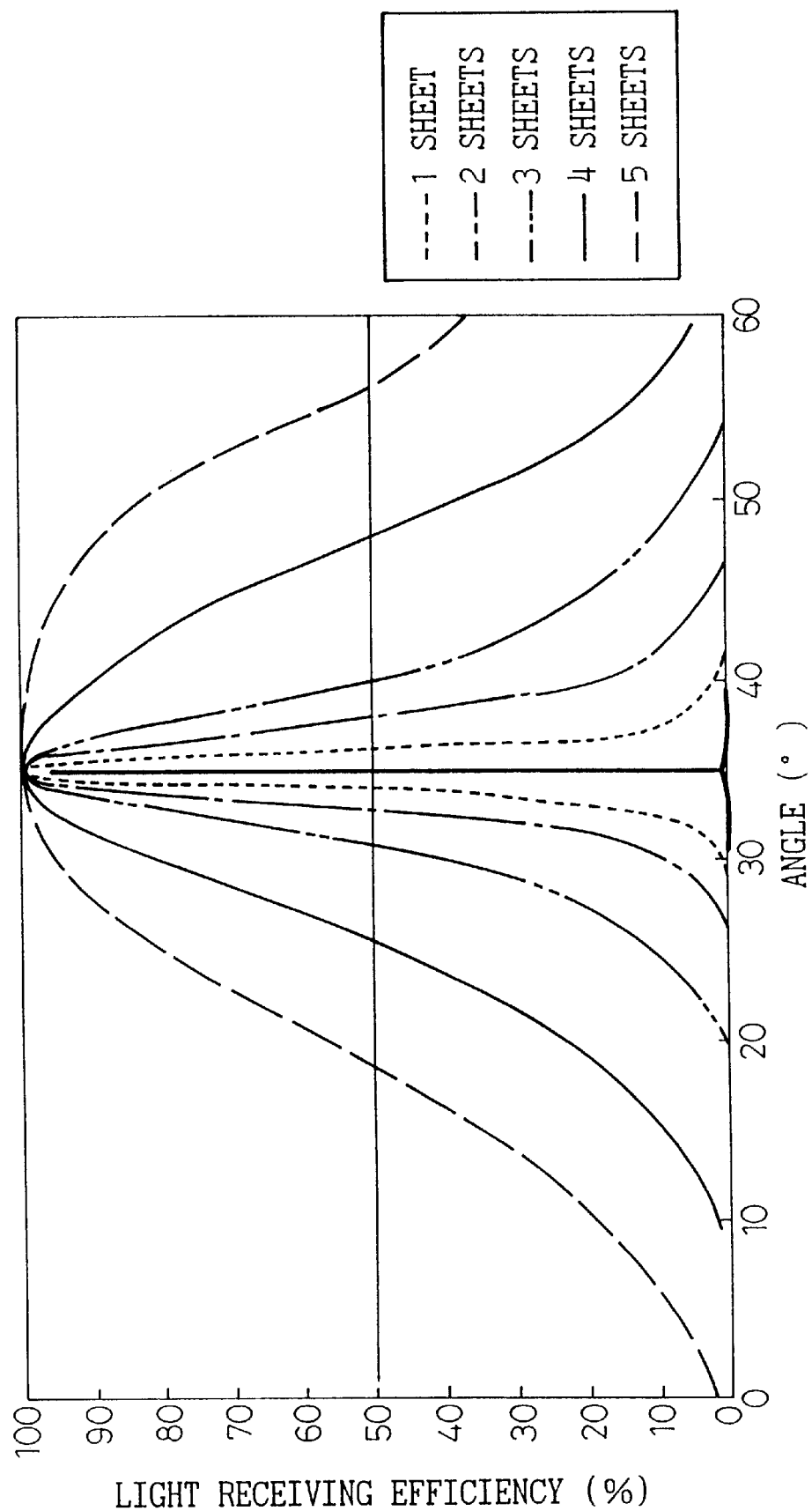
FIG. 30 shows a relationship between a laminated scattering element and an angle θ according to the embodiment 3.

An intensity level measured at an angle θ is K, and an intensity level measured at θ=0 is K0. A light receiving ratio is calculated as (K/K0)×100 (%). FIG. 30 shows results of the tests with an ordinate representing the light receiving ratio and an abscissa the angle θ.

In FIG. 30, the scattering angle of a given lamination serving as a light scattering element is defined as a range of θ where the light receiving ratio is above 50%. For example, a single translucent film provides the light receiving ratio of 50% in the range of 34 to 36 degrees. This range corresponds to a scattering angle of two degrees.

The lamination 52 serves as the scattering element 12 of the hologram screen 9b of the embodiment 2. For comparison, a hologram screen having no lamination and an opaque white screen having no hologram element were prepared in the tests.

Figure 31:
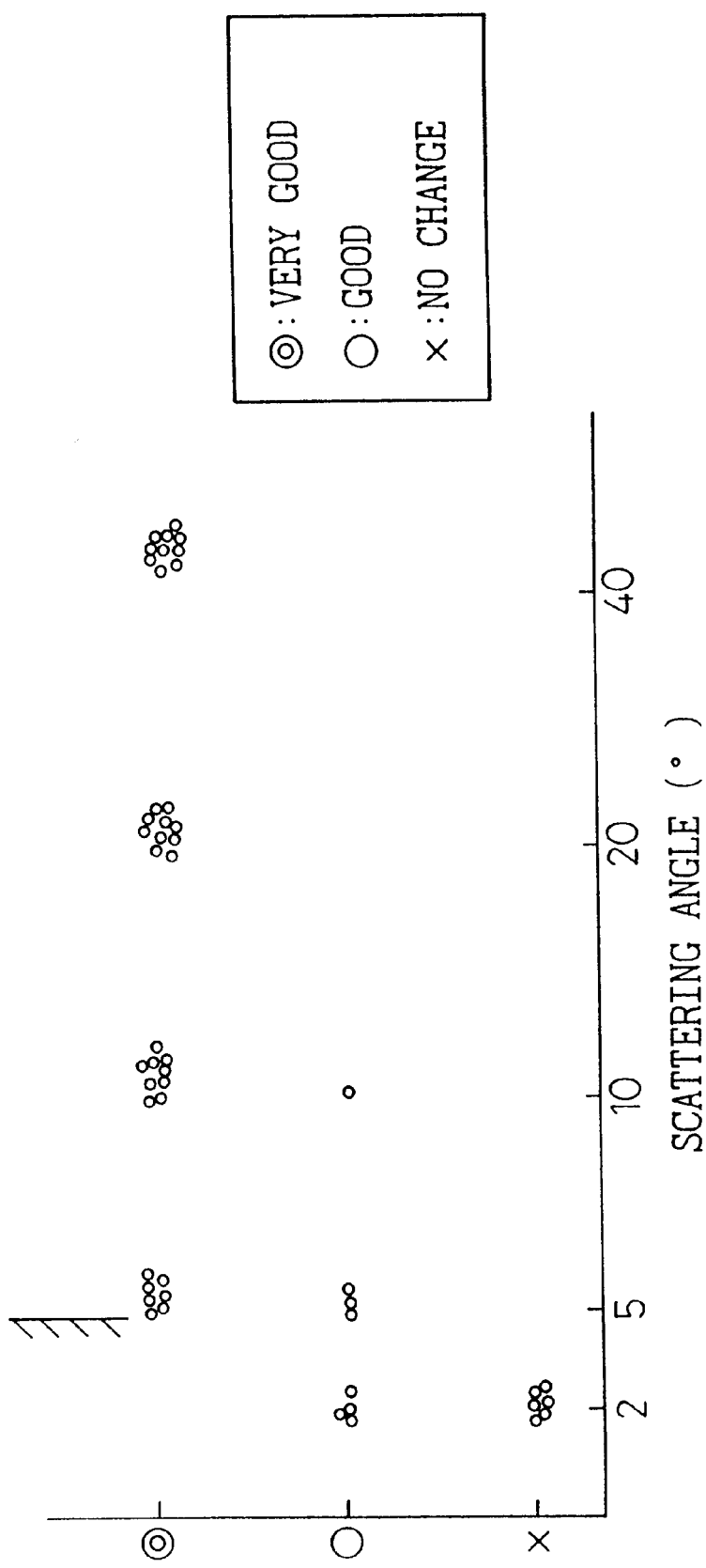
FIG. 31 shows a relationship between a scattering angle and color reproducibility according to the embodiment 3.

Visual tests were carried out by projecting the same beam onto the hologram screens with the laminations and the comparison objects and by letting viewers examine the colors of images displayed on them. FIG. 31 shows results of the visual tests.

In FIG. 31, "No change" indicates that no improvement is observed on the screen with lamination over the screen without lamination, "Improved" indicates that an improvement is observed on the screen with lamination over the screen without lamination, and "Quite improved" indicates that an improvement comparable to that of the opaque white screen is observed on the screen with lamination.

FIG. 31 shows that most of the viewers sense an improvement in color reproducibility on the hologram screens having a light scattering element whose scattering angle is greater than five degrees.

The light scattering elements may be made of a single light scattering film or a lamination of several light scattering films.

Embodiment 4

Figure 32:
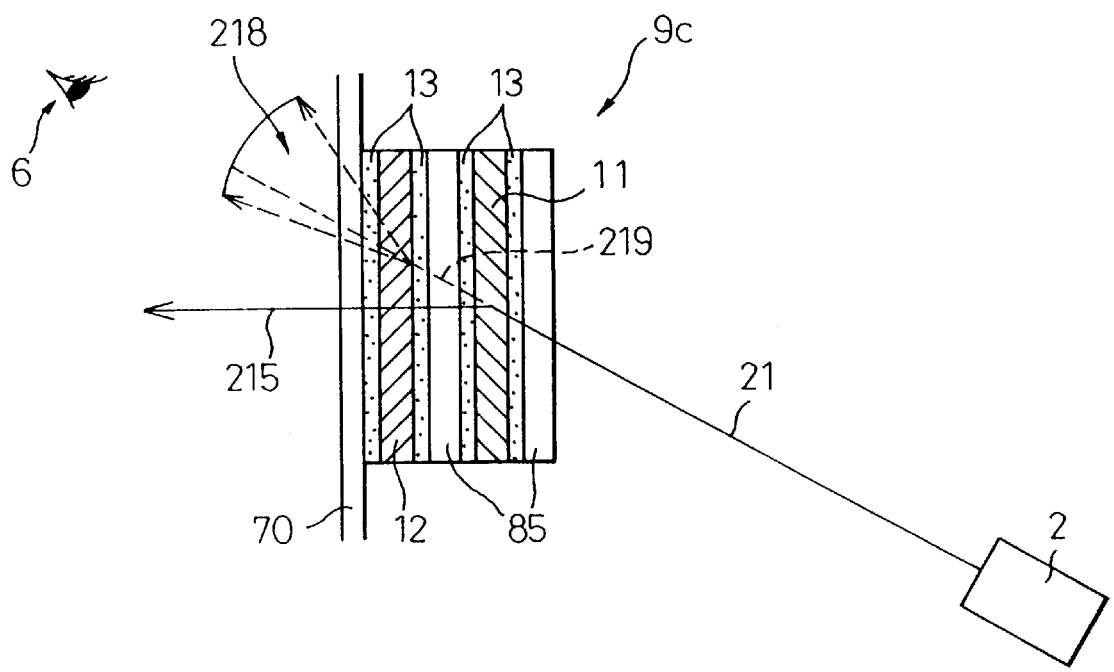
FIG. 32 is a sectional view showing a hologram screen and a light scattering element arranged opposite to a projector according to an embodiment 4 of the present invention.

This embodiment attaches the hologram screen of the embodiment 2 to a window glass as shown in FIG. 32.

In FIG. 32, a hologram screen 9c consists of a hologram element 11, adhesive layers 13 attached to opposite sides of the hologram element 11, cover films 85 attached to the adhesive layers 13, respectively, and a light scattering element 12 attached to one of the cover films 85 with an adhesive layer 13. The scattering element 12 is arranged opposite to a projector 2.

The hologram screen 9c is bonded to a window glass 70 with an adhesive layer 13.

The characteristics and functions of the hologram screen 9c are the same as those of the hologram screen 9b of the embodiment 2.

Figure 33:
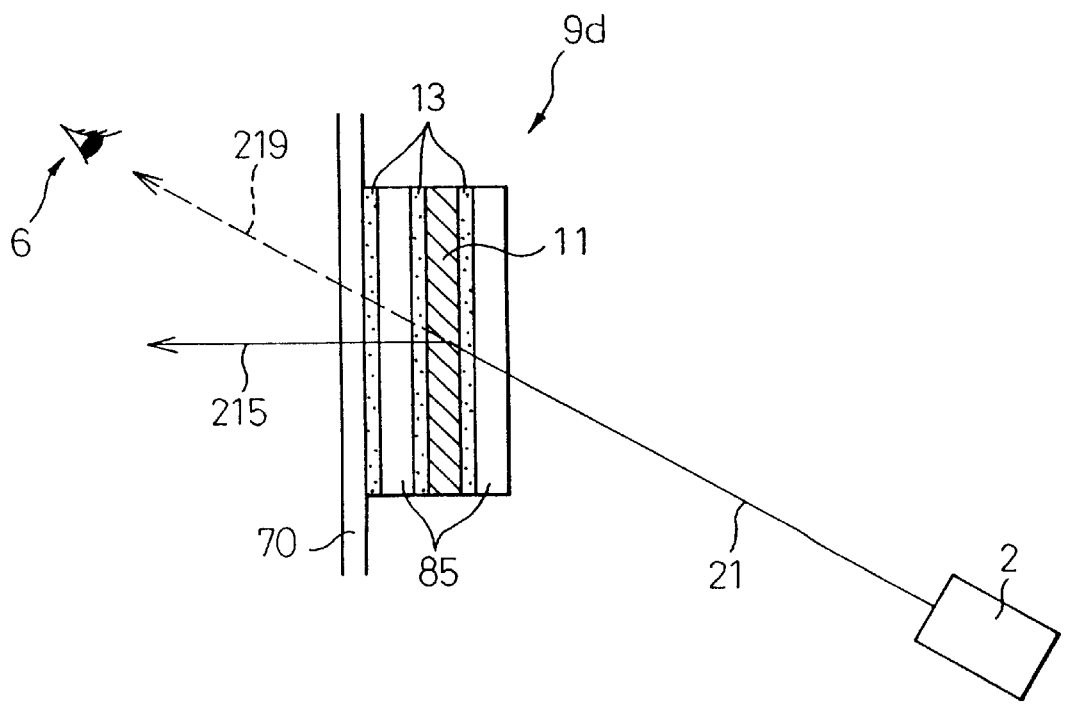
FIG. 33 is a sectional view showing a hologram screen without a light scattering element according to a prior art.

In FIG. 33, a hologram screen 9d differs from the hologram screen 9c of FIG. 32 in that it has no light scattering element 12.

The hologram screen 9d receives a beam 21 from a projector 2. The beam 21 is diffracted and scattered by the hologram element 11, to provide an exiting beam 215. The exiting beam 215 forms an image seen by a viewer 6.

The exiting beam 215 expands due to interference fringes formed on the hologram element 11, and FIG. 33 only shows the center line of the expanded beam.

The projected beam 21 is not completely diffracted and scattered by the hologram element 11. Part of the beam 21 is simply transmitted through the hologram element 11 to form a zero-order beam 219.

If the viewer 6 is in the zero-order beam 219, he or she directly sees the glare of the beam 219.

To avoid the glare of such zero-order beams, a prior art arranges a louver filter on the hologram element 11 on the viewer 6 side.

The louver filter, however, blocks diffracted and scattered beams that exit in the same direction as the zero-order beams. If the viewer 6 sees the hologram screen 9d in the same direction as the zero-order beam 219, he or she will see no image on the screen 9d because exiting beams are totally blocked by the louver filter.

To solve this problem, the hologram screen 9c of the embodiment 4 of FIG. 32 arranges the scattering element 12 opposite to the projector 2.

A zero-order beam 219 passed through the hologram element 11 is scattered by the scattering element 12 to form a scattered beam 218 that expands toward the viewer 6.

Even if the viewer 6 is on the zero-order beam 219, he or see senses no glare because the beam 219 is expanded into the beam 218.

Although diffracted beams from the hologram screen 9c traveling in the same direction as the zero-order beam 219 are also expanded or scattered, they are not blocked, and therefore, the viewer 6 can see them.

The effect and operation of the hologram screen 9c of the embodiment 4 are the same as those of the embodiment 2.

What is claimed is:

1. A hologram screen comprising:
   a hologram element comprising a pattern produced by an object beam which has passed through a diffuser prior to impinging on the hologram element for diffracting and diffusing a projected beam from a projector; and
   a light scattering element having a scattering angle of five degrees or larger, said light scattering element arranged with respect to said hologram element so as to scatter light one of before and after passing through said hologram element.

2. The hologram screen of claim 1, wherein the light scattering element is arranged on a side of the hologram element onto which the projector beam from the projector is to impinge when the hologram screen is in use as a display.

3. The hologram screen of claim 1, wherein the light scattering element is arranged on a side of the hologram element opposite to a side onto which the projector beam from the projector is to impinge when the hologram screen is in use as a display.

4. The hologram screen of claim 1, wherein the light scattering element only scatters an incident projected beam whose incident angle is within a preselected range.

5. The hologram screen of any one of claims 2 and 3, wherein the light scattering element only scatters an incident projected beam whose incident angle is within a preselected range.

6. The hologram screen of claim 1, wherein the perpendicular transmittance of the light scattering element is within the range of 30% to 100%.

7. The hologram screen of claim 2, wherein the perpendicular transmittance of the light scattering element is within the range of 30% to 100%.

8. The hologram screen of claim 4, wherein the perpendicular transmittance of the light scattering element is within the range of 30% to 100%.

9. The hologram screen of claim 5, wherein the perpendicular transmittance of the light scattering element is within the range of 30% to 100%.

10. The hologram screen of claim 1, wherein the light scattering element scatters an incident beam over an angle of θ that is defined as follows:

$$\sin^{-1}\{\sin\theta i - \lambda 1/\lambda 0 \cdot (\sin\theta o - \sin\theta r)\} \leq \theta \leq \sin^{-1}\{\sin\theta i - \lambda 2/\lambda 0 \cdot (\sin\theta o - \sin\theta r)\}$$

where λ0 is a recording wavelength used to make the hologram element, λ1 is 380 nm, λ2 is 780 nm (visible light ranging from 380 nm to 780 nm), θr is an incident angle, at the given point, of a reference beam used to make the hologram element, θo is an incident angle, at the given point, of an object beam used to make the hologram element, and θi is an exiting angle, at the given point, of a diffracted beam emanating from the hologram element.

11. The hologram screen of any of claims 6 and 8, wherein the light scattering element scatters an incident beam over an angle of θ that is defined as follows:

$$\sin^{-1}\{\sin\theta i - \lambda 1/\lambda 0 \cdot (\sin\theta o - \sin\theta r)\} \leq \theta \leq \sin^{-1}\{\sin\theta i - \lambda 2/\lambda 0 \cdot (\sin\theta o - \sin\theta r)\}$$

where λ0 is a recording wavelength used to make the hologram element, λ1 is 380 nm, λ2 is 780 nm (visible light ranging from 380 nm to 780 nm), θr is an incident angle, at the given point, of a reference beam used to make the hologram element, θo is an incident angle, at the given point, of an object beam used to make the hologram element, and θi is an exiting angle, at the given point, of a diffracted beam emanating from the hologram element.

12. The hologram screen of claim 11, wherein the light scattering element scatters an incident beam over an angle of θ that is defined as follows:

$$\sin^{-1}\{\sin\theta i - \lambda 1/\lambda 0 \cdot (\sin\theta o - \sin\theta r)\} \leq \theta \leq \sin^{-1}\{\sin\theta i - \lambda 2/\lambda 0 \cdot (\sin\theta o - \sin\theta r)\}$$

where λ0 is a recording wavelength used to make the hologram element, λ1 is 380 nm, λ2 is 780 nm (visible light ranging from 380 nm to 780 nm), θr is an incident angle, at the given point, of a reference beam used to make the hologram element, θo is an incident angle, at the given point, of an object beam used to make the hologram element, and θi is an exiting angle, at the given point, of a diffracted beam emanating from the hologram element.

13. The hologram screen of claim 5, wherein the light scattering element scatters an incident beam over an angle of θ that is defined as follows:

$$\sin^{-1}\{\sin\theta i - \lambda 1/\lambda 0 \cdot (\sin\theta o - \sin\theta r)\} \leq \theta \leq \sin^{-1}\{\sin\theta i - \lambda 2/\lambda 0 \cdot (\sin\theta o - \sin\theta r)\}$$

where λ0 is a recording wavelength used to make the hologram element, λ1 is 380 nm, λ2 is 780 nm (visible light ranging from 380 nm to 780 nm), θr is an incident angle, at the given point, of a reference beam used to make the hologram element, θo is an incident angle, at the given point, of an object beam used to make the hologram element, and θi is an exiting angle, at the given point of a diffracted beam emanating from the hologram element.

14. The hologram screen of claim 13, wherein the light scattering element scatters an incident beam over an angle of θ that is defined as follows:

$$\sin^{-1}\{\sin\theta i - \lambda 1/\lambda 0 \cdot (\sin\theta o - \sin\theta r)\} \leq \theta \leq \sin^{-1}\{\sin\theta i - \lambda 2/\lambda 0 \cdot (\sin\theta o - \sin\theta r)\}$$

where $\lambda 0$ is a recording wavelength used to make the hologram element, $\lambda 0$ is 380 nm, $\lambda 2$ is 780 nm (visible light ranging from 380 nm to 780 nm), or is an incident angle, at the given point, of a reference beam used to make the hologram element, θo is an incident angle, at the given point, of an object beam used to make the hologram element, and θi is an exiting angle, at the given point, of a diffracted beam emanating from the hologram element.

15. A hologram display comprising:

a projector;

a hologram screen comprising a hologram element comprising a pattern produced by an object beam which has passed through a diffuser prior to impinging on the hologram element for diffracting and diffusing a projected beam from the projector; and a light scattering element having a scattering angle of five degrees or larger, said light scattering element arranged with respect to said hologram element so as to scatter light one of before and after passing through said hologram element.

\* \* \* \* \*